US012769336B2

(12) United States Patent
Konishi et al.

(10) Patent No.: US 12,769,336 B2
(45) Date of Patent: Oct. 20, 2026

(54) MANAGEMENT SYSTEM OF WORKPLACE AND METHOD FOR MANAGING WORKPLACE

(71) Applicant: Komatsu Ltd., Tokyo (JP)

(72) Inventors: Shota Konishi, Tokyo (JP); Atsushi Sakai, Tokyo (JP); Kenta Osagawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 173 days.

(21) Appl. No.: 18/854,184

(22) PCT Filed: Sep. 4, 2023

(86) PCT No.: PCT/JP2023/032235

§ 371 (c)(1),
(2) Date: Oct. 4, 2024

(87) PCT Pub. No.: WO2024/062908

PCT Pub. Date: Mar. 28, 2024

(65) Prior Publication Data

US 2025/0244774 A1 Jul. 31, 2025

(30) Foreign Application Priority Data

Sep. 21, 2022 (JP) ................................ 2022-150558

(51) Int. Cl.

*E21F 5/02* (2006.01)
*G05D 1/648* (2024.01)
*G05D 1/692* (2024.01)
*G05D 105/05* (2024.01)
*G05D 107/70* (2024.01)

(52) U.S. Cl.

CPC ............... *G05D 1/692* (2024.01); *E21F 5/02* (2013.01); *G05D 1/648* (2024.01); *G05D 2105/05* (2024.01); *G05D 2107/73* (2024.01)

(58) Field of Classification Search

None
See application file for complete search history.

(56) References Cited

U.S. PATENT DOCUMENTS 12,060,696 B2 * 8/2024 Maeda .................. G05D 1/644
2015/0233245 A1 8/2015 Sheehan et al.
2018/0218301 A1 * 8/2018 Shike ................ G06Q 30/0645
2021/0089040 A1 * 3/2021 Ebrahimi Afrouzi ........................ G05D 1/0248
2022/0066456 A1 * 3/2022 Ebrahimi Afrouzi ........................ G06F 3/04883
2023/0052077 A1 * 2/2023 Maeda .................. G06Q 10/06
2024/0016138 A1 * 1/2024 Takeda .................. G05D 1/637

(Continued)

FOREIGN PATENT DOCUMENTS

CN 213967238 U * 8/2021
CN 108952226 B * 4/2022 .......... E04H 1/1211

(Continued)

*Primary Examiner* — Shelley Chen

(74) *Attorney, Agent, or Firm* — Troutman Pepper Locke LLP

(57) ABSTRACT

A management system of a workplace includes: an expected time calculation unit that calculates an expected time at which an unmanned haul vehicle arrives at a work area; and a water-sprinkling condition decision unit that decides a water-sprinkling condition of an unmanned water-sprinkling vehicle in the work area based on the expected time.

20 Claims, 23 Drawing Sheets

(56) References Cited

U.S. PATENT DOCUMENTS

| | | | | |
|---|---|---|---|---|
| 2024/0059314 | A1* | 2/2024 | Yamada | G05D 1/6987 |
| 2024/0075928 | A1 | 3/2024 | Takeda et al. | |

FOREIGN PATENT DOCUMENTS

| | | | | | |
|---|---|---|---|---|---|
| JP | H09-158141 | A | | 6/1997 | |
| JP | 6578366 | B2 | * | 9/2019 | E02F 9/2054 |
| JP | 2021114055 | A | * | 8/2021 | G05D 1/69 |
| JP | 2022125707 | A | * | 8/2022 | E01H 3/02 |
| JP | 7486733 | B2 | * | 5/2024 | G05D 1/69 |
| JP | 7660390 | B2 | * | 4/2025 | G05D 1/0214 |
| KR | 20120112315 | A | * | 10/2012 | G08B 21/10 |
| KR | 101570665 | B1 | * | 11/2015 | G08B 21/10 |
| KR | 102038911 | B1 | * | 10/2019 | B05B 13/02 |
| KR | 20230074609 | A | * | 5/2023 | B60S 1/481 |
| KR | 102545809 | B1 | * | 6/2023 | G06Q 50/30 |
| WO | WO-2017061516 | A1 | * | 4/2017 | G06Q 50/08 |
| WO | WO-2021145392 | A1 | * | 7/2021 | G05D 1/69 |
| WO | 2022/176414 | A1 | | 8/2022 | |
| WO | WO-2022176496 | A1 | * | 8/2022 | E01H 3/02 |

* cited by examiner

MANAGEMENT SYSTEM OF WORKPLACE AND METHOD FOR MANAGING WORKPLACE

FIELD

The present disclosure relates to a management system of a workplace and a method for managing the workplace.

BACKGROUND

As disclosed in Patent Literature 1, water sprinkling may be performed by a water-sprinkling truck at a workplace.

CITATION LIST

Patent Literature

Patent Literature 1: US 2015/0,233,245 A

SUMMARY

Technical Problem

Diffusion of mine dust or cloud of dust at a workplace is suppressed due to water sprinkling. At the workplace, not only a water-sprinkling truck (water-sprinkling vehicle) but also a dump truck (haul vehicle) operates. When a haul work of the dump truck is hindered by water-sprinkling work of the water-sprinkling truck, there is a possibility that productivity of the workplace is lowered.

An object of the present disclosure is to suppress a decrease in productivity at a workplace.

Solution to Problem

In order to achieve an aspect of the present invention, a management system of a workplace, the system comprises: an expected time calculation unit that calculates an expected time at which an unmanned haul vehicle arrives at a work area; and a water-sprinkling condition decision unit that decides a water-sprinkling condition of an unmanned water-sprinkling vehicle in the work area based on the expected time.

Advantageous Effects of Invention

According to the present disclosure, a decrease in productivity at a workplace is suppressed.

DESCRIPTION OF EMBODIMENTS

Hereinafter, embodiments according to the present disclosure will be described with reference to the drawings, but the present disclosure is not limited to the embodiments. Components of the embodiments described below can be appropriately combined. In addition, some components may not be used.

[Workplace]

Figure 1:
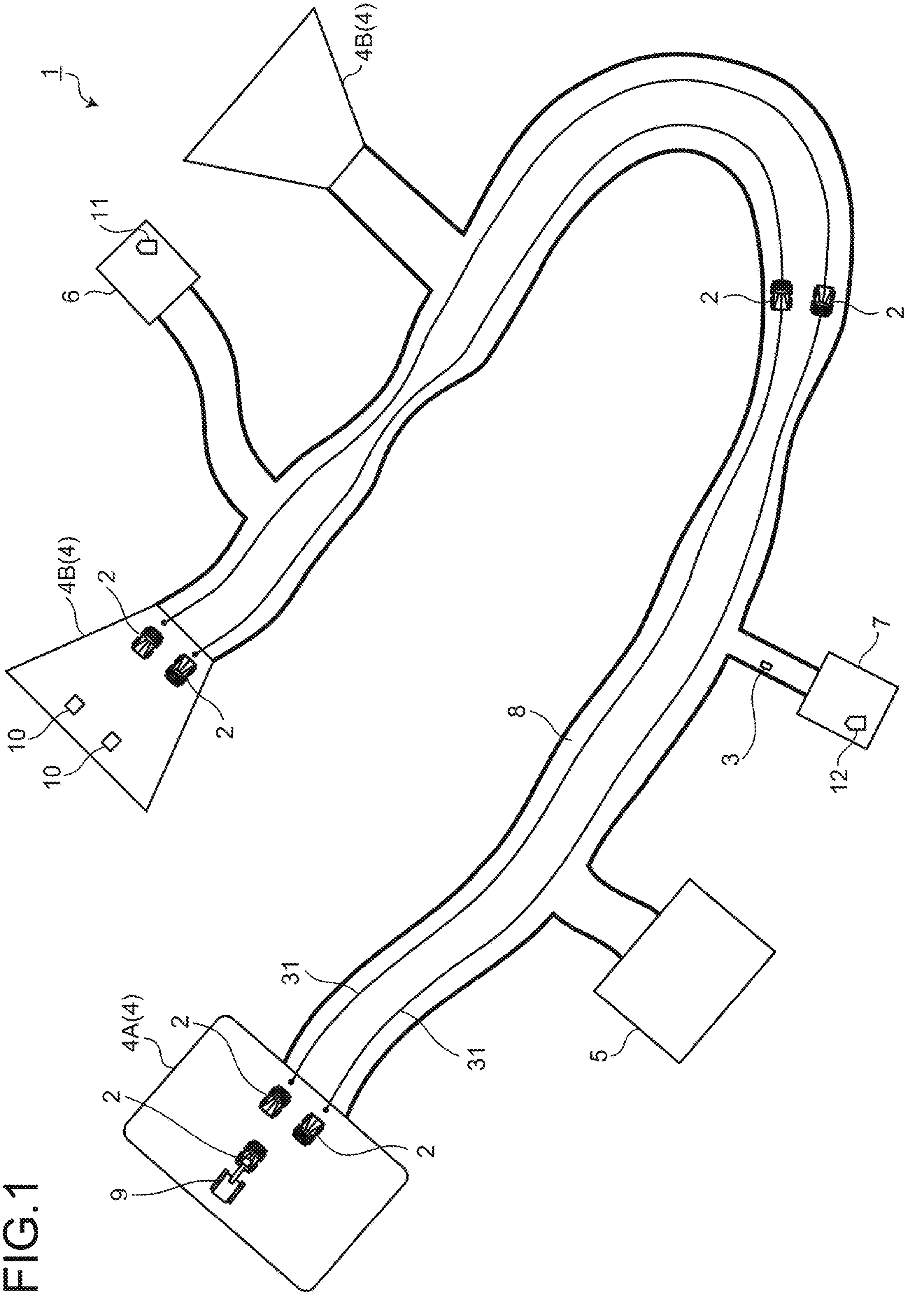
FIG. 1 is a schematic view illustrating a workplace of an unmanned vehicle according to an embodiment.

FIG. 1 is a schematic view illustrating a workplace 1 of an unmanned vehicle according to the embodiment. In the embodiment, the workplace 1 is a mine. The mine refers to a place or a business place where minerals are mined. Examples of the mine include a metal mine where metals are mined, a non-metal mine where limestones are mined, and a coal mine where coals are mined. In the workplace 1, a plurality of unmanned vehicles operate. The unmanned vehicle refers to a work vehicle that operates in an unmanned manner without depending on a driving operation of a driver. In the embodiment, the unmanned vehicle operating at the workplace 1 includes an unmanned haul vehicle 2 and an unmanned water-sprinkling vehicle 3.

The unmanned haul vehicle 2 travels in the workplace 1 in an unmanned manner to haul a load. In the embodiment, the unmanned haul vehicle 2 is an unmanned dump truck. An excavated object excavated at the workplace 1 is exemplified as a load to be hauled by the unmanned haul vehicle 2. The unmanned water-sprinkling vehicle 3 travels in the workplace 1 in an unmanned manner and sprinkles water. In the embodiment, the unmanned water-sprinkling vehicle 3 is an unmanned water-sprinkling truck. The unmanned water-sprinkling vehicle 3 sprinkles water to suppress diffusion of mine dust or cloud of dust at the workplace 1.

The workplace is provided with a work area 4, a parking lot 5, a fuel filling station 6, a water supply station 7, and a traveling path 8. The work area 4 includes at least one of a loading station 4A and a soil discharging station 4B. The loading station 4A refers to an area where a loading work is performed in which loading equipment 9 loads a load onto the unmanned haul vehicle 2. The loading equipment 9 operates in the loading station 4A. The loading equipment 9 is manned equipment operated by a driver. In the embodiment, the loading equipment 9 is an excavator. The soil discharging station 4B is an area where a soil discharging work is performed in which a load is discharged by the unmanned haul vehicle 2. Crushing equipment 10 is provided in the soil discharging station 4B. The parking lot 5 is an area where at least one of the unmanned haul vehicle 2 and the unmanned water-sprinkling vehicle 3 is parked. The fuel filling station 6 is an area where at least one of the unmanned haul vehicle 2 and the unmanned water-sprinkling vehicle 3 is supplied with fuel. Fuel filling equipment 11 that supplies fuel is provided in the fuel filling station 6. The water supply station 7 is an area where the unmanned water-sprinkling vehicle 3 is supplied with water. In the water supply station 7, water for sprinkling is supplied to the unmanned water-sprinkling vehicle 3. The water supply station 7 is provided with water supply equipment 12 that supplies water. The traveling path 8 refers to an area where an unmanned vehicle travels toward at least one of the work area 4, the parking lot 5, the fuel filling station 6, and the water supply station 7. The traveling path 8 is provided to connect at least the loading station 4A and the soil discharging station 4B. In the embodiment, the traveling path 8 is connected to each of the loading station 4A, the soil discharging station 4B, the parking lot 5, the fuel filling station 6, and the water supply station 7.

[Management System]

Figure 2:
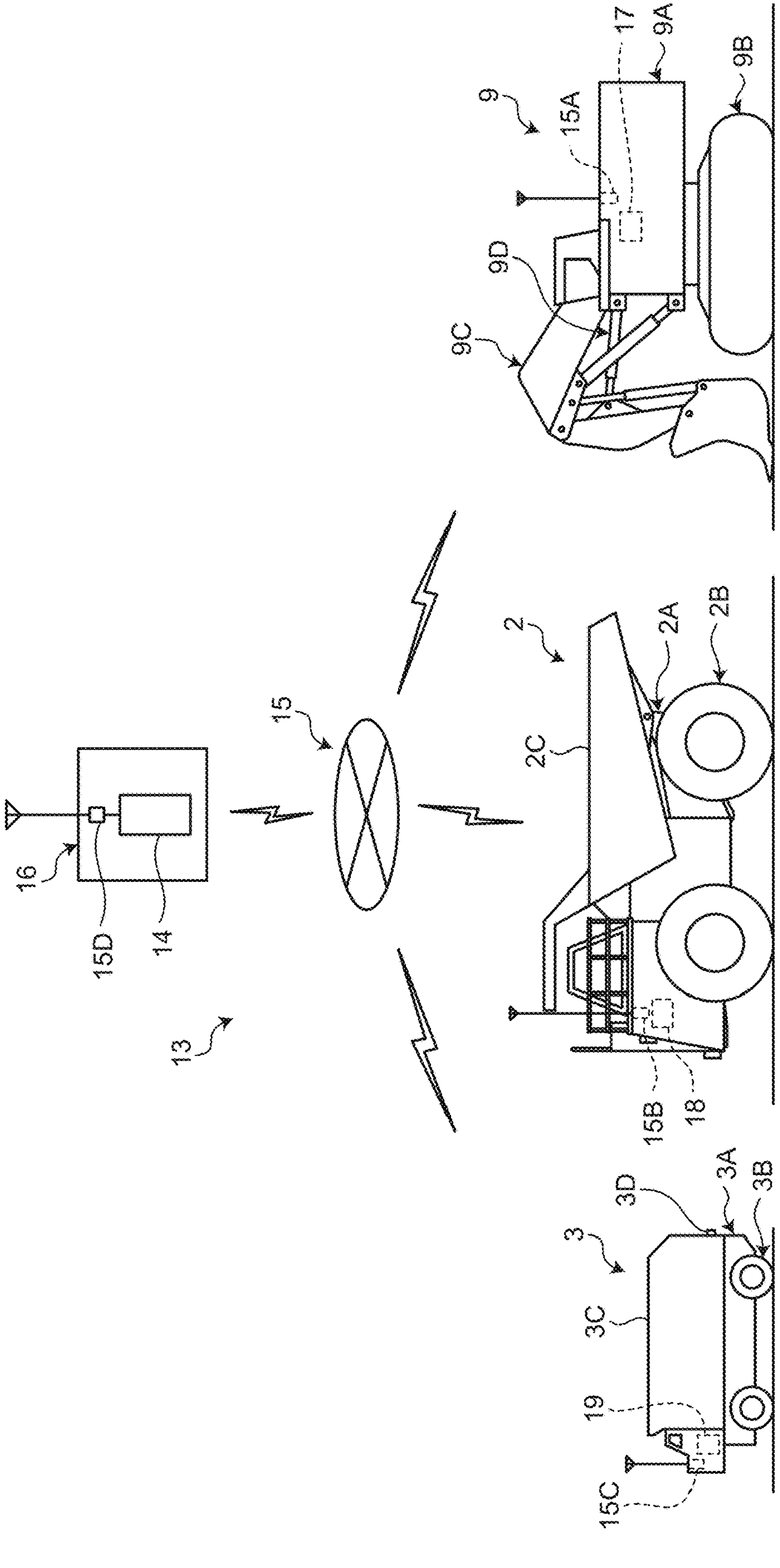
FIG. 2 is a schematic view illustrating a management system of the workplace according to the embodiment.

FIG. 2 is a schematic view illustrating a management system 13 of the workplace 1 according to the embodiment. The management system 13 includes a management device 14 and a communication system 15. The management device 14 includes a computer system. The management device 14 is disposed outside each of the unmanned haul vehicle 2, the unmanned water-sprinkling vehicle 3, and the loading equipment 9. The management device 14 is installed in a control facility 16 of the workplace 1. The management device 14 manages the workplace 1. A manager is present in the control facility 16. The management device 14 manages each of the unmanned haul vehicle 2, the unmanned water-sprinkling vehicle 3, and the loading equipment 9. Examples of the communication system 15 include the Internet, a mobile phone communication network, a satellite communication network, and a local area network (LAN). Wi-Fi (registered trademark), that is one standard of wireless LAN, is exemplified as the local area network.

The loading equipment 9 includes a swing body 9A, a traveling body 9B, working equipment 9C, a working equipment cylinder 9D, a control device 17, and wireless communication equipment 15A. The control device 17 includes a computer system. The wireless communication equipment 15A is connected to the control device 17. The swing body 9A swings while being supported by the traveling body 9B. The traveling body 9B includes a pair of crawler belts. The traveling body 9B allows the loading equipment 9 to move at the workplace 1 including the loading station 4A. The working equipment 9C is supported by the swing body 9A. The working equipment 9C includes a boom rotatably coupled to the swing body 9A, an arm rotatably coupled to the boom, and a bucket rotatably coupled to the arm. The working equipment cylinder 9D operates the working equipment 9C. The working equipment cylinder 9D is a hydraulic cylinder. The working equipment cylinder 9D includes a boom cylinder that performs a raising operation or a lowering operation of the boom, an arm cylinder that performs a pulling operation or a pushing operation of the arm, and a bucket cylinder that that performs a tilting operation or a dumping operation of the bucket.

Figure 3:
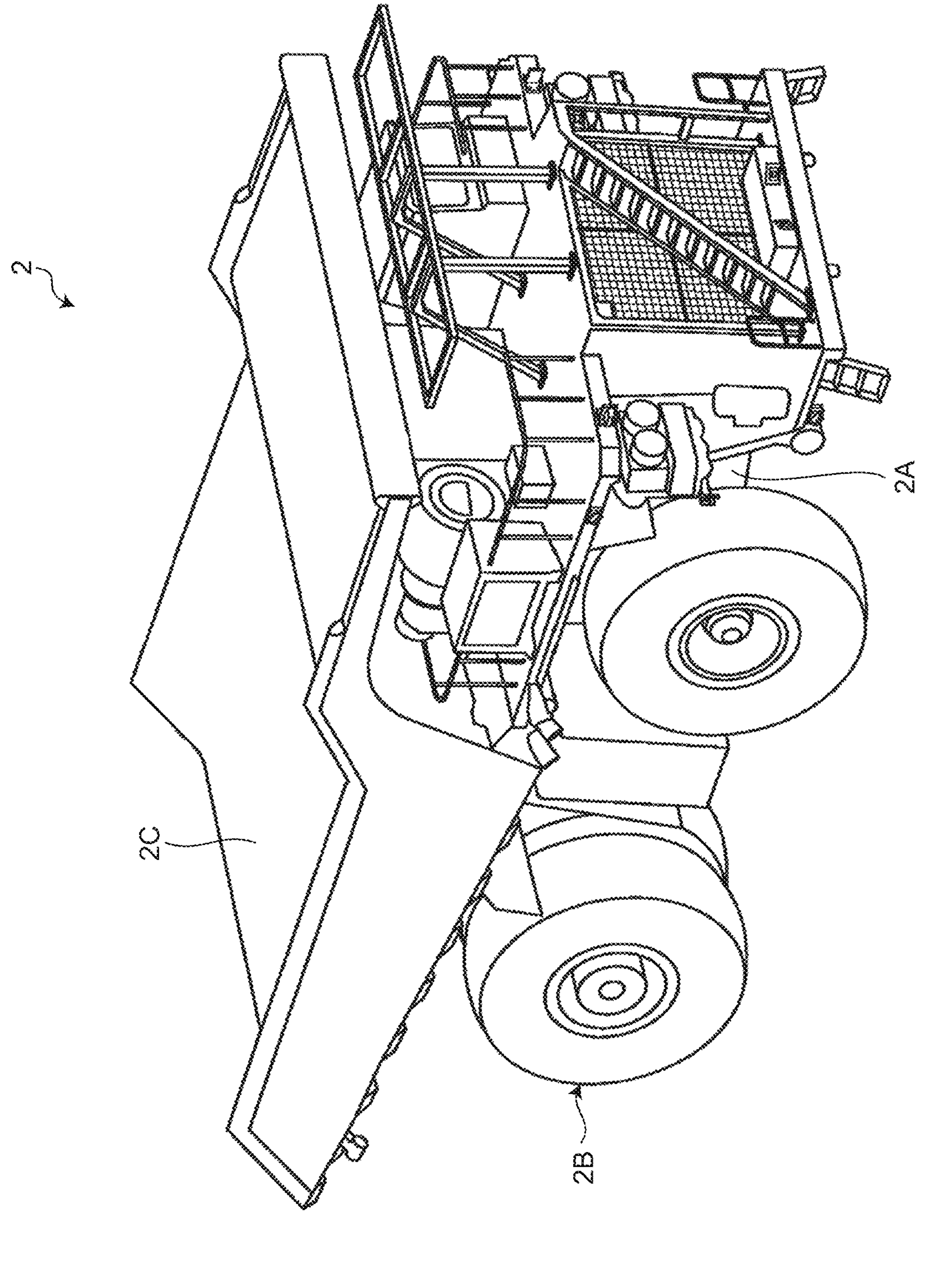
FIG. 3 is a perspective view illustrating an unmanned haul vehicle according to the embodiment.

FIG. 3 is a perspective view illustrating the unmanned haul vehicle 2 according to the embodiment. As illustrated in FIGS. 2 and 3, the unmanned haul vehicle 2 includes a vehicle body 2A, a traveling device 2B, a dump body 2C, a control device 18, and wireless communication equipment 15B. The control device 18 includes a computer system. The wireless communication equipment 15B is connected to the control device 18. The vehicle body 2A includes a vehicle body frame. The vehicle body 2A is supported by the traveling device 2B. The traveling device 2B travels while supporting the vehicle body 2A. The traveling device 2B includes wheels, tires mounted on the wheels, an engine, a brake device, and a steering device. The dump body 2C is a member on which a load is loaded by the loading equipment 9. The dump body 2C is supported by the vehicle body 2A. The dump body 2C performs a dumping operation and a lowering operation. The dumping operation refers to an operation of separating the dump body 2C from the vehicle body 2A and inclining the dump body 2C in a dump direction. The lowering operation refers to an operation of bringing the dump body 2C close to the vehicle body 2A. When the loading work is performed, the dump body 2C performs the lowering operation. When the soil discharging work is performed, the dump body 2C performs the dumping operation.

Figure 4:
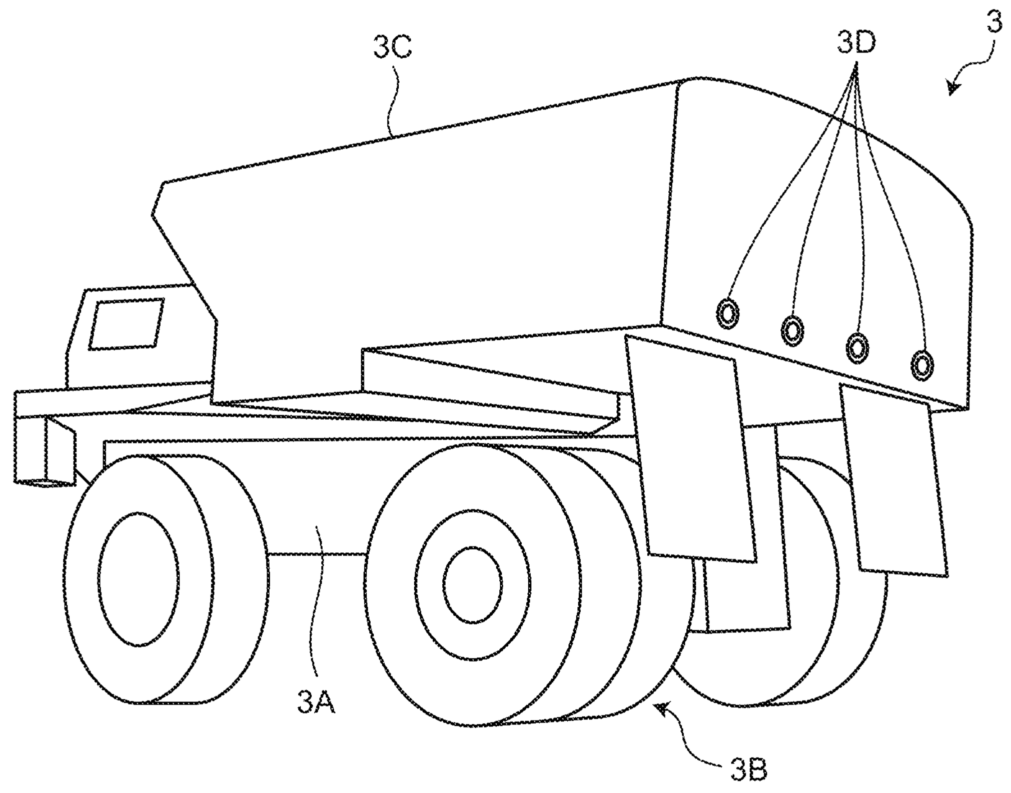
FIG. 4 is a perspective view illustrating an unmanned water-sprinkling vehicle according to the embodiment.

FIG. 4 is a perspective view illustrating the unmanned water-sprinkling vehicle 3 according to the embodiment. As illustrated in FIGS. 2 and 4, the unmanned water-sprinkling vehicle 3 includes a vehicle body 3A, a traveling device 3B, a tank 3C, a water-sprinkling spray 3D, a control device 19, and wireless communication equipment 15C. The control device 19 includes a computer system. The wireless communication equipment 15C is connected to the control device 19. The vehicle body 3A includes a vehicle body frame. The vehicle body 3A is supported by the traveling device 3B. The vehicle body 3A supports the tank 3C. The traveling device 3B includes wheels, tires mounted on the wheels, an engine, a brake device, and a steering device. The tank 3C is a member that stores water for sprinkling. At least a part of the tank 3C is disposed above the vehicle body 3A. The water-sprinkling spray 3D sprays water in the tank 3C. The water-sprinkling spray 3D is disposed at the rear of the tank 3C. The water-sprinkling spray 3D sprinkles water behind the unmanned water-sprinkling vehicle 3. In the embodiment, a plurality of water-sprinkling sprays 3D are provided. The plurality of water-sprinkling sprays 3D are arranged at intervals in a vehicle width direction of the unmanned water-sprinkling vehicle 3 at the rear of the tank 3C. The vehicle width direction refers to a direction parallel to a rotation axis of the wheel when the unmanned water-sprinkling vehicle 3 is in a straight traveling state.

The communication system 15 includes the wireless communication equipment 15A connected to the control device 17, the wireless communication equipment 15B connected to the control device 18, the wireless communication equipment 15C connected to the control device 19, and a wireless communication equipment 15D connected to the management device 14. The management device 14 and the control device 17 of the loading equipment 9 wirelessly communicate with each other via the communication system 15. The management device 14 and the control device 18 of the unmanned haul vehicle 2 wirelessly communicate with each other via the communication system 15. The management device 14 and the control device 19 of the unmanned water-sprinkling vehicle 3 wirelessly communicate with each other via the communication system 15.

Figure 5:
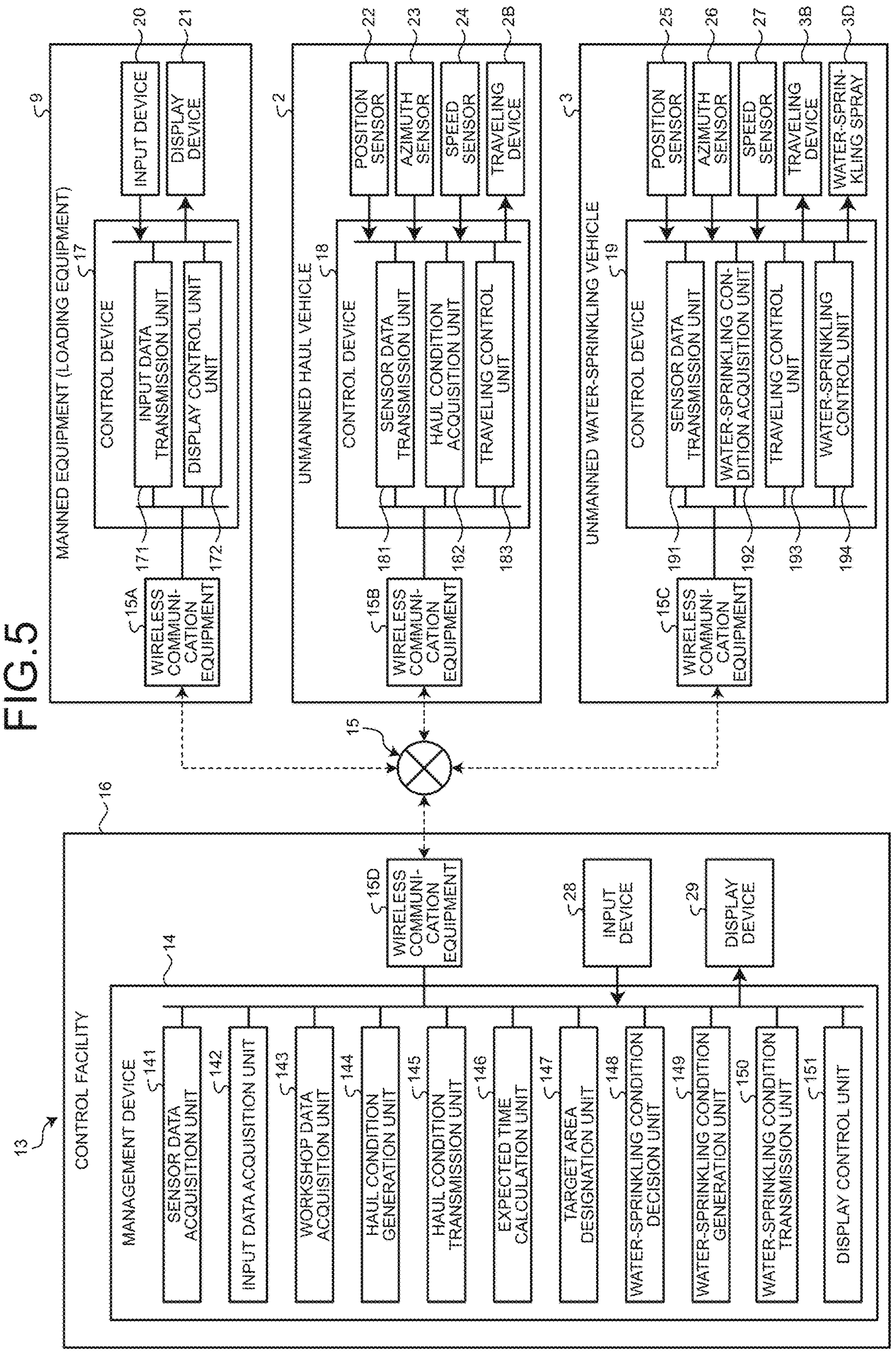
FIG. 5 is a block diagram illustrating the management system of the workplace according to the embodiment.

FIG. 5 is a block diagram illustrating the management system 13 of the workplace 1 according to the embodiment. The management system 13 includes the management device 14, the communication system 15, the control device 17, the control device 18, and the control device 19.

The loading equipment 9 includes the control device 17, the wireless communication equipment 15A, an input device 20, and a display device 21. Each of the wireless communication equipment 15A, the input device 20, and the display device 21 can communicate with the control device 17. The input device 20 is disposed in a cab of the loading equipment 9. The input device 20 is operated by the driver of the loading equipment 9 and generates input data. The input data generated by operating the input device 20 is transmitted to the control device 17. Examples of the input device 20 include a touch panel, a computer keyboard, a mouse, and an operation button. Note that the input device 20 may be a non-contact type input device including an optical sensor, or may be a voice input device. The display device 21 is disposed in the cab of the loading equipment 9. The display device 21 displays display data transmitted from the control device 17. The display device 21 includes a flat panel display such as a liquid crystal display (LCD) or an organic electroluminescence display (OELD).

The unmanned haul vehicle 2 includes the control device 18, the wireless communication equipment 15B, a position sensor 22, an azimuth sensor 23, a speed sensor 24, and the traveling device 2B. Each of the wireless communication equipment 15B, the position sensor 22, the azimuth sensor 23, and the speed sensor 24 can communicate with the control device 18. The traveling device 2B is controlled by the control device 18. The position sensor 22 detects a position of the unmanned haul vehicle 2. The position of the unmanned haul vehicle 2 is detected using a global navigation satellite system (GNSS). The global navigation satellite system includes a global positioning system (GPS). The global navigation satellite system detects a position in a global coordinate system defined by coordinate data of latitude, longitude, and altitude. The global coordinate system refers to a coordinate system fixed to the earth. The position sensor 22 includes a GNSS receiver and detects the position of the unmanned haul vehicle 2 in the global coordinate system. The azimuth sensor 23 detects a direction of the unmanned haul vehicle 2. The direction of the unmanned haul vehicle 2 includes a yaw angle of the unmanned haul vehicle 2. When an axis extending in a vertical direction at a center of gravity of the vehicle body 2A is a yaw axis, the yaw angle refers to a rotation angle around the yaw axis. A gyro sensor is exemplified as the azimuth sensor 23. The speed sensor 24 detects the traveling speed of the unmanned haul vehicle 2. As the speed sensor 24, a pulse sensor that detects rotation of the wheels of the unmanned haul vehicle 2 is exemplified.

The unmanned water-sprinkling vehicle 3 includes the control device 19, the wireless communication equipment 15C, a position sensor 25, an azimuth sensor 26, a speed sensor 27, the traveling device 3B, and the water-sprinkling spray 3D. Each of the wireless communication equipment 15C, the position sensor 25, the azimuth sensor 26, and the speed sensor 27 can communicate with the control device 19. Each of the traveling device 3B and the water-sprinkling spray 3D is controlled by the control device 19. The position sensor 25 detects a position of the unmanned water-sprinkling vehicle 3. The position of the unmanned water-sprinkling vehicle 3 is detected using the global navigation satellite system (GNSS). The position sensor 25 includes a GNSS receiver and detects the position of the unmanned water-sprinkling vehicle 3 in the global coordinate system. The azimuth sensor 26 detects a direction of the unmanned water-sprinkling vehicle 3. A gyro sensor is exemplified as the azimuth sensor 26. The speed sensor 27 detects the traveling speed of the unmanned water-sprinkling vehicle 3. As the speed sensor 27, a pulse sensor that detects rotation of the wheels of the unmanned water-sprinkling vehicle 3 is exemplified.

The management device 14 includes a computer system. An input device 28 and a display device 29 are connected to the management device 14. The input device 28 is disposed in the control facility 16. The input device 28 is operated by the manager of the control facility 16 and generates input data. The input data generated by operating the input device 28 is transmitted to the management device 14. Examples of the input device 28 include a touch panel, a computer keyboard, a mouse, and an operation button. Note that the input device 28 may be a non-contact type input device including an optical sensor, or may be a voice input device. The display device 29 is disposed in the control facility 16. The display device 29 displays display data transmitted from the control device 19. The display device 29 includes a flat panel display such as a liquid crystal display (LCD) or an organic electroluminescence display (OELD).

The management device 14 includes a sensor data acquisition unit 141, an input data acquisition unit 142, a work area data acquisition unit 143, a haul condition generation unit 144, a haul condition transmission unit 145, an expected time calculation unit 146, a target area designation unit 147, a water-sprinkling condition decision unit 148, a water-sprinkling condition generation unit 149, a water-sprinkling condition transmission unit 150, and a display control unit 151.

The sensor data acquisition unit 141 acquires detected data of each of the position sensor 22, the azimuth sensor 23, and the speed sensor 24 of the unmanned haul vehicle 2 via the communication system 15. The sensor data acquisition unit 141 acquires detected data of each of the position sensor 25, the azimuth sensor 26, and the speed sensor 27 of the unmanned water-sprinkling vehicle 3 via the communication system 15.

The input data acquisition unit 142 acquires input data generated by operating the input device 28 disposed in the control facility 16. In addition, the input data acquisition unit 142 acquires, via the communication system 15, input data generated by operating the input device 20 of the loading equipment 9.

The work area data acquisition unit 143 acquires outer shape data indicating an outer shape of the work area 4. The outer shape data of the work area 4 includes outer shape data of the loading station 4A and outer shape data of the soil discharging station 4B. For example, the manager can operate the input device 28 and input the outer shape data of the work area 4 to the management device 14. The work area data acquisition unit 143 can acquire the outer shape data of the work area 4 from the input device 28. Note that the outer shape data of the work area 4 may be measured in advance by, for example, survey and stored in advance in the work area data acquisition unit 143.

The haul condition generation unit 144 generates a haul condition of the unmanned haul vehicle 2. The haul condition of the unmanned haul vehicle 2 includes haul traveling data indicating a traveling condition of the unmanned haul vehicle 2. The traveling condition of the unmanned haul vehicle 2 includes a target traveling speed of the unmanned haul vehicle 2 and a haul path indicating a target traveling route of the unmanned haul vehicle 2. The haul condition generation unit 144 can generate the haul traveling data based on, for example, the input data from the input device 28. Note that the haul condition of the unmanned haul vehicle 2 may include the timing of the dumping operation of the dump body 2C and the timing of the lowering operation of the dump body 2C.

The haul condition transmission unit 145 transmits the haul condition generated by the haul condition generation unit 144 to the unmanned haul vehicle 2 via the communication system 15.

Figure 6:
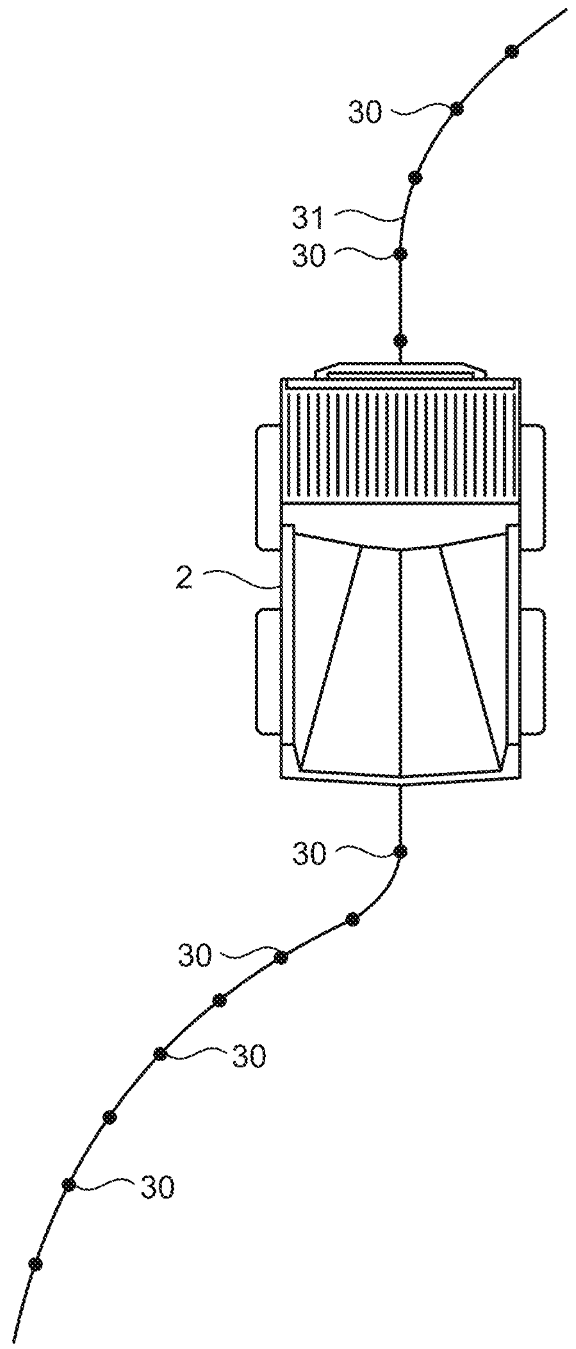
FIG. 6 is a diagram for explaining haul traveling data of the unmanned haul vehicle according to the embodiment.

FIG. 6 is a diagram for explaining the haul traveling data of the unmanned haul vehicle 2 according to the embodiment. The haul traveling data defines the traveling condition of the unmanned haul vehicle 2. The haul traveling data includes a traveling point 30, a haul path 31, a target position of the unmanned haul vehicle 2, a target azimuth of the unmanned haul vehicle 2, and a target traveling speed of the unmanned haul vehicle 2. A plurality of traveling points 30 are set at least in the work area 4. A plurality of traveling points 30 are set on the traveling path 8. The traveling point 30 defines the target position of the unmanned haul vehicle 2. The target azimuth and the target traveling speed of the unmanned haul vehicle 2 are set to each of the plurality of traveling points 30. The plurality of traveling points 30 are set at intervals. The interval between the traveling points 30 is set to, for example, longer than or equal to 1 [m] and shorter than or equal to 5 [m]. The intervals between the traveling points 30 may be uniform or non-uniform. The haul path 31 is a virtual line indicating a target traveling route of the unmanned haul vehicle 2. The haul path 31 is defined by a trajectory passing the plurality of traveling points 30. The unmanned haul vehicle 2 travels in the workplace along the haul path 31. The target position of the unmanned haul vehicle 2 refers to a target position of the unmanned haul vehicle 2 when passing the traveling point 30. The target position of the unmanned haul vehicle 2 may be defined in a local coordinate system of the unmanned haul vehicle 2 or may be defined in a global coordinate system. The target azimuth of the unmanned haul vehicle 2 refers to a target azimuth of the unmanned haul vehicle 2 when passing the traveling point 30. The target traveling speed of the unmanned haul vehicle 2 refers to a target traveling speed of the unmanned haul vehicle 2 when passing the traveling point 30.

The expected time calculation unit 146 calculates an expected time at which the unmanned haul vehicle 2 arrives at the work area 4. In the embodiment, the expected time calculation unit 146 calculates the expected time at which the unmanned haul vehicle 2 arrives at the work area 4 based on the haul traveling data of the unmanned haul vehicle 2 and position data indicating a current position of the unmanned haul vehicle 2.

Figure 7:
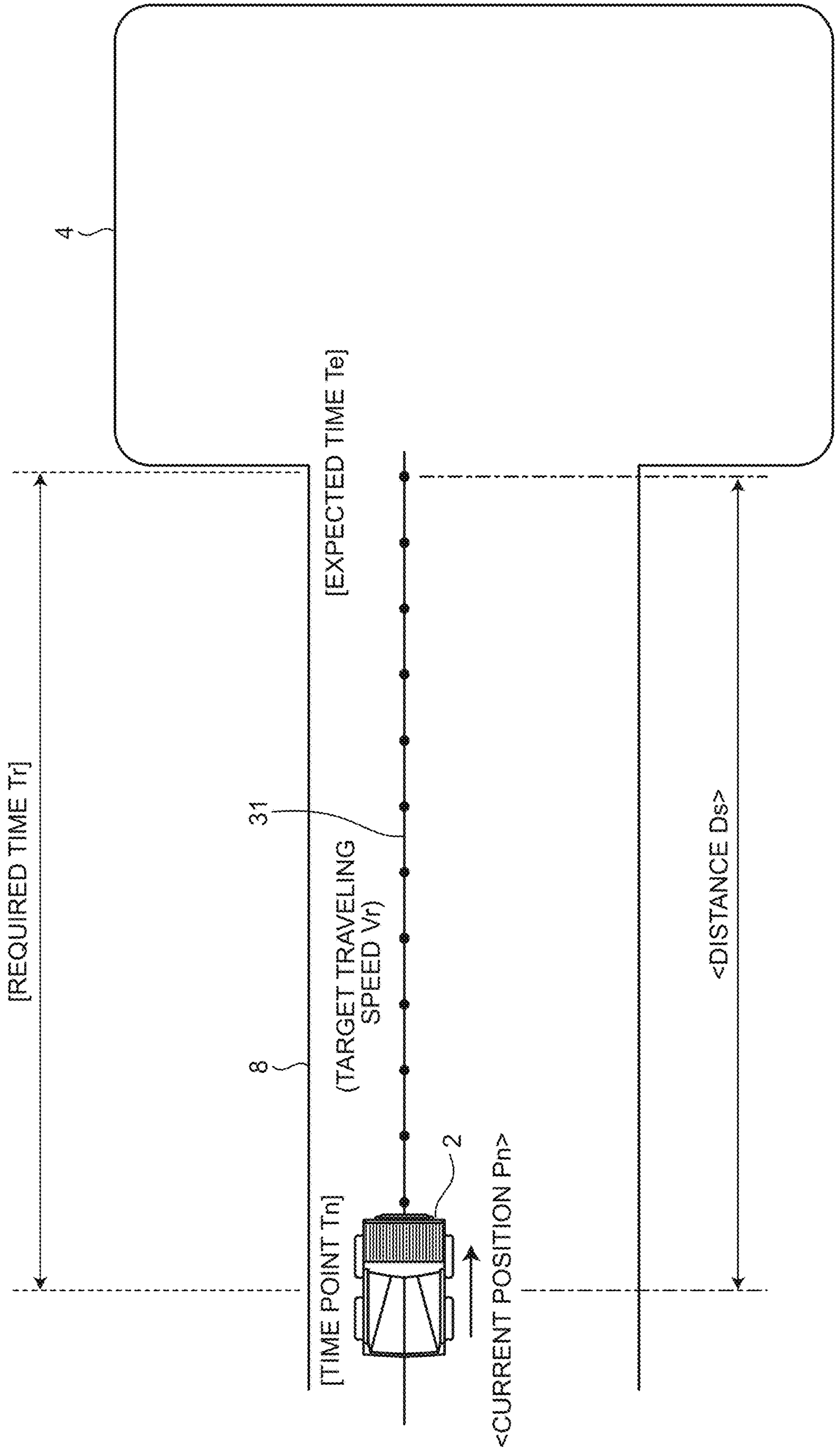
FIG. 7 is a diagram for explaining a method for calculating an expected time at which the unmanned haul vehicle arrives at a work area according to the embodiment.

FIG. 7 is a diagram for explaining a method for calculating an expected time Te at which the unmanned haul vehicle 2 arrives at the work area 4 according to the embodiment. A current position Pn of the unmanned haul vehicle 2 is detected by the position sensor 22 of the unmanned haul vehicle 2. The sensor data acquisition unit 141 can acquire position data indicating the current position Pn of the unmanned haul vehicle 2 from the position sensor 22 via the communication system 15. A distance Ds from the current position Pn of the unmanned haul vehicle 2 to the work area 4 is equal to the length of the haul path 31 from the current position Pn of the unmanned haul vehicle 2 to the work area 4. The haul traveling data includes a target traveling speed Vr of the unmanned haul vehicle 2. The expected time calculation unit 146 can calculate the expected time Te at which the unmanned haul vehicle 2 arrives at the work area 4 based on a time point Tn at which the position sensor 22 detects the current position Pn of the unmanned haul vehicle 2, the distance Ds, and the target traveling speed Vr of the unmanned haul vehicle 2 between the current position Pn and the work area 4. Note that the distance Ds may be regarded as the sum of distances between the traveling points 30 adjacent to each other between the current position Pn and the work area 4. As described above, the target traveling speed Vr is set for each of the plurality of traveling points 30. The target traveling speed Vr may be a different value for each of the plurality of traveling points 30. Note that the expected time calculation unit 146 may calculate a required time Tr required for the unmanned haul vehicle 2 to arrive at the work area 4 from the current position Pn. The required time Tr is equal to the difference between the expected time Te and the time point Tn.

When the unmanned haul vehicle 2 is traveling on the traveling path 8 toward the loading station 4A, the expected time calculation unit 146 can calculate the expected time Te at which the unmanned haul vehicle 2 arrives at the loading station 4A or the required time Tr based on the haul traveling data set on the traveling path 8 and the position data indicating the current position Pn of the unmanned haul vehicle 2 detected by the position sensor 22. When the unmanned haul vehicle 2 is traveling on the traveling path 8 toward the soil discharging station 4B, the expected time calculation unit 146 can calculate the expected time Te at which the unmanned haul vehicle 2 arrives at the soil discharging station 4B or the required time Tr based on the haul traveling data set on the traveling path 8 and the position data indicating the current position Pn of the unmanned haul vehicle 2 detected by the position sensor 22.

The target area designation unit 147 designates a water-sprinkling target area in the work area 4. The target area designation unit 147 can designate the water-sprinkling target area based on the haul path 31 of the unmanned haul vehicle 2 set in the work area 4. The target area designation unit 147 can designate the water-sprinkling target area based on the outer shape data of the work area 4 acquired by the work area data acquisition unit 143. The manager of the control facility 16 can operate the input device 28 and input the water-sprinkling target area to the management device 14. The input data acquisition unit 142 acquires designated input data indicating input data of the water-sprinkling target area from the input device 28. The target area designation unit 147 can designate the water-sprinkling target area based on the designated input data acquired by the input data acquisition unit 142. The driver of the loading equipment 9 can operate the input device 20 and input the water-sprinkling target area to the management device 14. The target area designation unit 147 may designate the water-sprinkling target area based on the designated input data from the input device 20 acquired by the input data acquisition unit 142.

The water-sprinkling condition decision unit 148 decides a water-sprinkling condition of the unmanned water-sprinkling vehicle 3 in the work area 4 based on the expected time Te at which the unmanned haul vehicle 2 arrives at the work area 4 calculated by the expected time calculation unit 146. When the expected time Te at which the unmanned haul vehicle 2 arrives at the loading station 4A is expected, the water-sprinkling condition decision unit 148 decides the water-sprinkling condition of the unmanned water-sprinkling vehicle 3 in the loading station 4A based on the expected time Te at which the unmanned haul vehicle 2 arrives at the loading station 4A. When the expected time Te at which the unmanned haul vehicle 2 arrives at the soil discharging station 4B is expected, the water-sprinkling condition decision unit 148 decides the water-sprinkling condition of the unmanned water-sprinkling vehicle 3 in the soil discharging station 4B based on the expected time Te at which the unmanned haul vehicle 2 arrives at the soil discharging station 4B.

In addition, the water-sprinkling condition decision unit 148 decides the water-sprinkling condition of the unmanned water-sprinkling vehicle 3 in the work area 4 where the unmanned haul vehicle 2 travels based on the condition input data from the input device 28 acquired by the input data acquisition unit 142. The manager of the control facility 16 can operate the input device 28 and input the water-sprinkling condition of the unmanned water-sprinkling vehicle 3 to the management device 14. The input data acquisition unit 142 acquires condition input data indicating input data of the water-sprinkling condition of the unmanned water-sprinkling vehicle 3 from the input device 28. The water-sprinkling condition decision unit 148 can decide the water-sprinkling condition of the unmanned water-sprinkling vehicle 3 in the work area 4 based on the condition input data acquired by the input data acquisition unit 142. When the condition input data of the unmanned water-sprinkling vehicle 3 in the loading station 4A is input, the water-sprinkling condition decision unit 148 decides the water-sprinkling condition of the unmanned water-sprinkling vehicle 3 in the loading station 4A based on the condition input data acquired by the input data acquisition unit 142. When the condition input data of the unmanned water-sprinkling vehicle 3 in the soil discharging station 4B is input, the water-sprinkling condition decision unit 148 decides the water-sprinkling condition of the unmanned water-sprinkling vehicle 3 in the soil discharging station 4B based on the condition input data acquired by the input data acquisition unit 142. The driver of the loading equipment 9 can operate the input device 20 and input the water-sprinkling condition of the unmanned water-sprinkling vehicle 3 to the management device 14. The water-sprinkling condition decision unit 148 may decide the water-sprinkling condition of the unmanned water-sprinkling vehicle 3 in the work area 4 based on the condition input data from the input device 20 acquired by the input data acquisition unit 142.

The water-sprinkling condition generation unit 149 generates the water-sprinkling condition of the unmanned water-sprinkling vehicle 3 decided by the water-sprinkling condition decision unit 148. The water-sprinkling condition of the unmanned water-sprinkling vehicle 3 includes water-sprinkling traveling data indicating a traveling condition of the unmanned water-sprinkling vehicle 3. The traveling condition of the unmanned water-sprinkling vehicle 3 includes a target traveling speed of the unmanned water-sprinkling vehicle 3 and a water-sprinkling path indicating a target traveling route of the unmanned water-sprinkling vehicle 3. Note that the water-sprinkling condition of the unmanned water-sprinkling vehicle 3 generated by the water-sprinkling condition generation unit 149 may include the timing of starting sprinkling from the water-sprinkling spray 3D, the timing of stopping sprinkling from the water-sprinkling spray 3D, and a sprinkling amount from the water-sprinkling spray 3D. In addition, when a plurality of water-sprinkling sprays 3D are provided in the unmanned water-sprinkling vehicle 3, the water-sprinkling condition may include the number of water-sprinkling sprays 3D that execute water sprinkling. In addition, when the water-sprinkling spray 3D is installed at each of a plurality of positions of the unmanned water-sprinkling vehicle 3, the water-sprinkling condition may include an installation position of the water-sprinkling spray 3D that executes water sprinkling.

The water-sprinkling condition transmission unit 150 transmits the water-sprinkling condition generated by the water-sprinkling condition generation unit 149 to the unmanned water-sprinkling vehicle 3 via the communication system 15.

Figure 8:
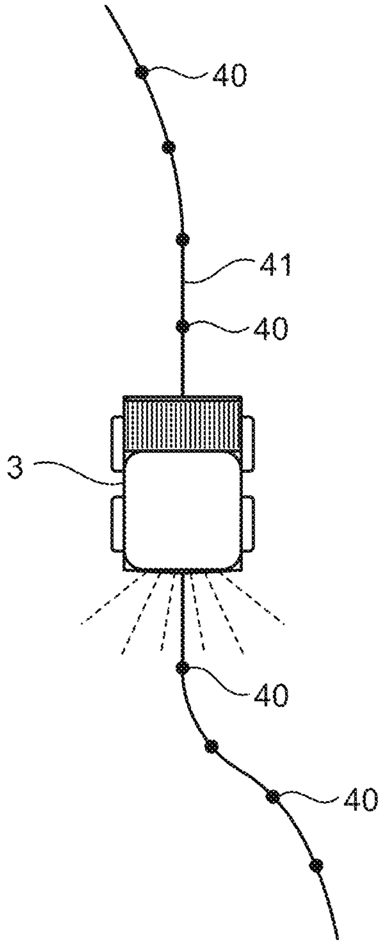
FIG. 8 is a diagram for explaining water-sprinkling traveling data of the unmanned water-sprinkling vehicle according to the embodiment.

FIG. 8 is a diagram for explaining the water-sprinkling traveling data of the unmanned water-sprinkling vehicle 3 according to the embodiment. The water-sprinkling traveling data defines the traveling condition of the unmanned water-sprinkling vehicle 3. The water-sprinkling traveling data includes a traveling point 40, a water-sprinkling path 41, a target position of the unmanned water-sprinkling vehicle 3, a target azimuth of the unmanned water-sprinkling vehicle 3, and a target traveling speed of the unmanned water-sprinkling vehicle 3. A plurality of traveling points 40 are set at least in the work area 4. The plurality of traveling points 40 are set on the traveling path 8. The water-sprinkling path 41 is a virtual line indicating a target traveling route of the unmanned water-sprinkling vehicle 3. The function of the haul traveling data and the function of the water-sprinkling traveling data are similar. The description of the water-sprinkling traveling data is omitted.

The display control unit 151 controls the display device 29. The display control unit 151 causes the display device 29 to display predetermined display data.

The control device 17 includes an input data transmission unit 171 and a display control unit 172. The input data transmission unit 171 acquires input data generated by operating the input device 20. The input data transmission unit 171 transmits the input data from the input device 20 to the management device 14 via the communication system 15. The display control unit 172 controls the display device 21. The display control unit 172 causes the display device 21 to display predetermined display data.

The control device 18 includes a sensor data transmission unit 181, a haul condition acquisition unit 182, and a traveling control unit 183. The sensor data transmission unit 181 acquires detected data of each of the position sensor 22, the azimuth sensor 23, and the speed sensor 24. The sensor data transmission unit 181 transmits the detected data of each of the position sensor 22, the azimuth sensor 23, and the speed sensor 24 to the management device 14 via the communication system 15. The haul condition acquisition unit 182 acquires the haul condition transmitted from the management device 14. The traveling control unit 183 controls the traveling device 2B based on the haul condition acquired by the haul condition acquisition unit 182. The traveling control unit 183 controls the traveling device 2B so that the unmanned haul vehicle 2 travels along the haul path 31 based on the haul traveling data of the unmanned haul vehicle 2 and the detected data of the position sensor 22. The traveling control unit 183 controls the traveling device 2B so that a deviation is reduced between the detected position of the unmanned haul vehicle 2 detected by the position sensor 22 when passing the traveling point 30 and the target position of the unmanned haul vehicle 2 set at the traveling point 30. The traveling control unit 183 controls the traveling device 2B so that a deviation is reduced between the detected azimuth of the unmanned haul vehicle 2 detected by the azimuth sensor 23 when passing the traveling point 30 and the target azimuth of the unmanned haul vehicle 2 set at the traveling point 30. The traveling control unit 183 controls the traveling device 2B so that a deviation is reduced between the detected traveling speed of the unmanned haul vehicle 2 detected by the speed sensor 24 when passing the traveling point 30 and the target traveling speed of the unmanned haul vehicle 2 set at the traveling point 30.

The control device 19 includes a sensor data transmission unit 191, a water-sprinkling condition acquisition unit 192, a traveling control unit 193, and a water-sprinkling control unit 194. The sensor data transmission unit 191 acquires detected data of each of the position sensor 25, the azimuth sensor 26, and the speed sensor 27. The sensor data transmission unit 191 transmits the detected data of each of the position sensor 25, the azimuth sensor 26, and the speed sensor 27 to the management device 14 via the communication system 15. The water-sprinkling condition acquisition unit 192 acquires the water-sprinkling condition transmitted from the management device 14. The traveling control unit 193 controls the traveling device 3B based on the water-sprinkling condition acquired by the water-sprinkling condition acquisition unit 192. The function of the traveling control unit 183 and the function of the traveling control unit 193 are similar. The traveling control unit 193 controls the traveling device 3B so that the unmanned water-sprinkling vehicle 3 travels along the water-sprinkling path 41 based on the water-sprinkling traveling data of the unmanned water-sprinkling vehicle 3 and the detected data of each of the position sensor 25 and the azimuth sensor 26. In addition, the traveling control unit 193 controls the traveling device 3B so that the unmanned water-sprinkling vehicle 3 travels at the target traveling speed based on the detected data of the speed sensor 27. The water-sprinkling control unit 194 controls the water-sprinkling spray 3D based on the water-sprinkling condition acquired by the water-sprinkling condition acquisition unit 192. The water-sprinkling control unit 194 controls the timing of starting sprinkling from the water-sprinkling spray 3D, the timing of stopping sprinkling from the water-sprinkling spray 3D, and a sprinkling amount from the water-sprinkling spray 3D based on the water-sprinkling condition acquired by the water-sprinkling condition acquisition unit 192. Furthermore, in addition, when a plurality of water-sprinkling sprays 3D are provided in the unmanned water-sprinkling vehicle 3, the water-sprinkling control unit 194 controls the number of water-sprinkling sprays 3D that execute water sprinkling based on the water-sprinkling condition acquired by the water-sprinkling condition acquisition unit 192. In addition, when the water-sprinkling spray 3D is installed at each of a plurality of positions of the unmanned water-sprinkling vehicle 3, the water-sprinkling control unit 194 controls the installation position of the water-sprinkling spray 3D that executes water sprinkling based on the water-sprinkling condition acquired by the water-sprinkling condition acquisition unit 192.

[Water-Sprinkling Condition]

Next, the water-sprinkling condition of the unmanned water-sprinkling vehicle 3 in the work area 4 will be described. In the embodiment, the water-sprinkling condition includes a first water-sprinkling condition, a second water-sprinkling condition, and a third water-sprinkling condition. The first water-sprinkling condition is a water-sprinkling condition for sprinkling water to a first water-sprinkling area 51 of the work area 4. The first water-sprinkling condition is a water-sprinkling condition requiring a first time T1 from the start of water sprinkling to the end of water sprinkling. The second water-sprinkling condition is a water-sprinkling condition for sprinkling water to a second water-sprinkling area 52 of the work area 4 larger than the first water-sprinkling area 51. The second water-sprinkling condition is a water-sprinkling condition requiring a second time T2 longer than the first time T1 from the start of water sprinkling to the end of water sprinkling. The third water-sprinkling condition is a water-sprinkling condition in which water is not sprinkled to the work area 4. In the following description, the first water-sprinkling condition is appropriately referred to as a simple water-sprinkling condition, the second water-sprinkling condition is appropriately referred to as a wide-area water-sprinkling condition, and the third water-sprinkling condition is appropriately referred to as a non-water-sprinkling condition.

In the embodiment, the water-sprinkling condition decision unit 148 decides at least one of the simple water-sprinkling condition, the wide-area water-sprinkling condition, and the non-water-sprinkling condition as the water-sprinkling condition based on the expected time Te at which the unmanned haul vehicle 2 arrives at the work area 4. In addition, the water-sprinkling condition decision unit 148 decides at least one of the simple water-sprinkling condition, the wide-area water-sprinkling condition, and the non-water-sprinkling condition as the water-sprinkling condition based on the condition input data acquired by the input data acquisition unit 142.

The simple water-sprinkling condition is generated based on the haul path 31 of the unmanned haul vehicle 2. The wide-area water-sprinkling condition is generated based on the water-sprinkling target area designated by the target area designation unit 147. In the embodiment, the water-sprinkling target area designated by the target area designation unit 147 is the second water-sprinkling area 52.

Figure 9:
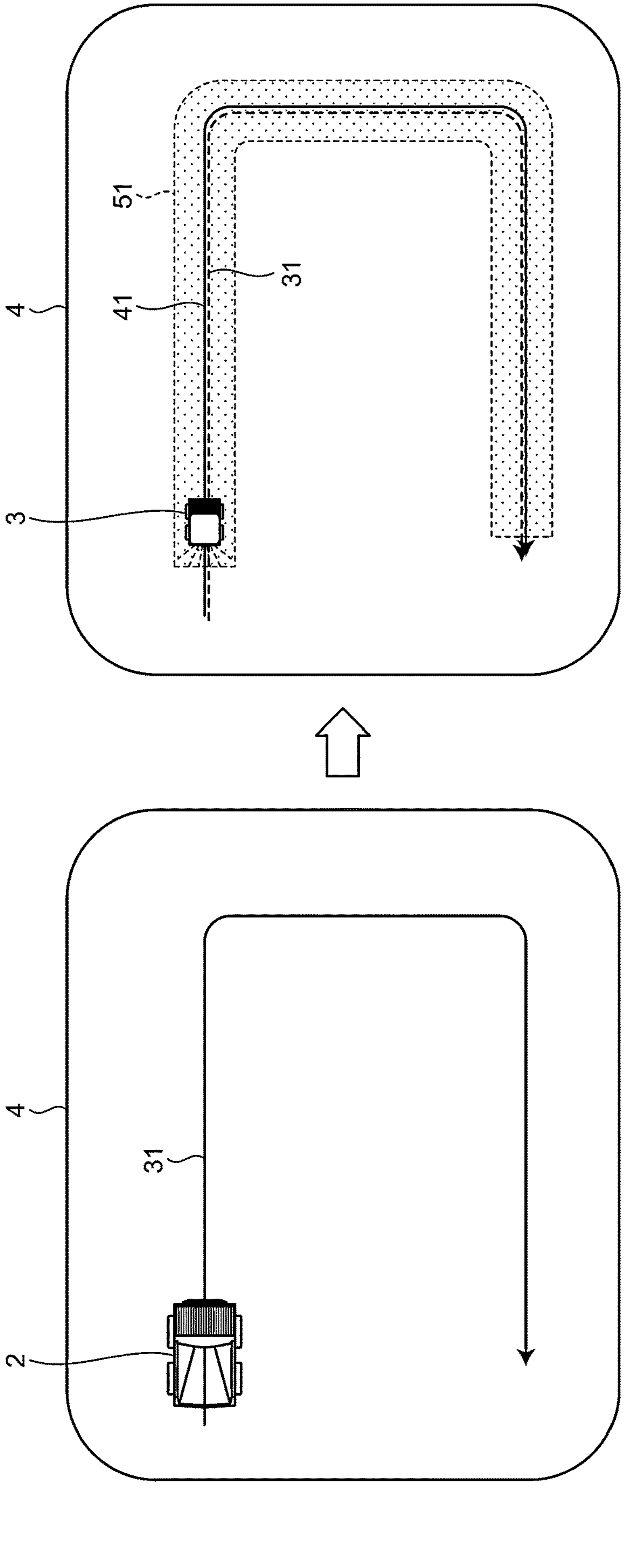
FIG. 9 is a schematic view for explaining a method for generating a simple water-sprinkling condition according to the embodiment.

FIG. 9 is a schematic view for explaining a method for generating the simple water-sprinkling condition according to the embodiment. As illustrated in FIG. 9, when the unmanned haul vehicle 2 travels along the haul path 31 in the work area 4, the water-sprinkling condition generation unit 149 generates the simple water-sprinkling condition based on the haul path 31. The water-sprinkling condition generation unit 149 may generate the simple water-sprinkling condition based on the haul path 31 of the unmanned haul vehicle 2 that traveled in the work area 4 before the execution of the water-sprinkling work. The water-sprinkling condition generation unit 149 may generate the simple water-sprinkling condition based on the haul path 31 of the unmanned haul vehicle 2 scheduled to travel in the work area 4 after the execution of the water-sprinkling work. The water-sprinkling condition generation unit 149 may generate the simple water-sprinkling condition based on the haul path 31 of a target vehicle indicating the unmanned haul vehicle 2 for which the expected time Te at which the unmanned haul vehicle 2 arrives at the work area 4 is calculated by the expected time calculation unit 146. The water-sprinkling condition generation unit 149 may generate the simple water-sprinkling condition based on the haul path 31 of the past vehicle indicating the unmanned haul vehicle 2 that traveled in the work area 4 in the past before the target vehicle. The water-sprinkling condition generation unit 149 may generate the simple water-sprinkling condition based on the haul path 31 of the future vehicle indicating the unmanned haul vehicle 2 scheduled to travel in the work area 4 in the future than the target vehicle.

The water-sprinkling condition includes the water-sprinkling path 41 of the unmanned water-sprinkling vehicle 3. In the generation of the simple water-sprinkling condition, the water-sprinkling condition generation unit 149 generates the water-sprinkling path 41 to match at least a part of the haul path 31. In the example illustrated in FIG. 9, the water-sprinkling condition generation unit 149 generates the water-sprinkling path 41 so that the entire haul path 31 and the water-sprinkling path 41 coincide with each other. Note that the water-sprinkling condition generation unit 149 may generate the water-sprinkling path 41 so that a part of the haul path 31 and the water-sprinkling path 41 coincide with each other.

For example, after the unmanned haul vehicle 2 traveled in the work area 4, the unmanned water-sprinkling vehicle 3 may sprinkle water while traveling along the water-sprinkling path 41. The unmanned water-sprinkling vehicle 3 may sprinkle water while traveling along an already-traveled area indicating a traveling area where the unmanned haul vehicle 2 already traveled before performing the water-sprinkling work. Before the unmanned haul vehicle 2 travels in the work area 4, the unmanned water-sprinkling vehicle 3 may sprinkle water while traveling along the water-sprinkling path 41. The unmanned water-sprinkling vehicle 3 may sprinkle water while traveling along a scheduled traveling area indicating a traveling area where the unmanned haul vehicle 2 is scheduled to travel after performing the water-sprinkling work. The first water-sprinkling area 51 to be sprinkled with water under the simple water-sprinkling condition overlaps at least a part of the traveling area of the unmanned haul vehicle 2.

Figure 10:
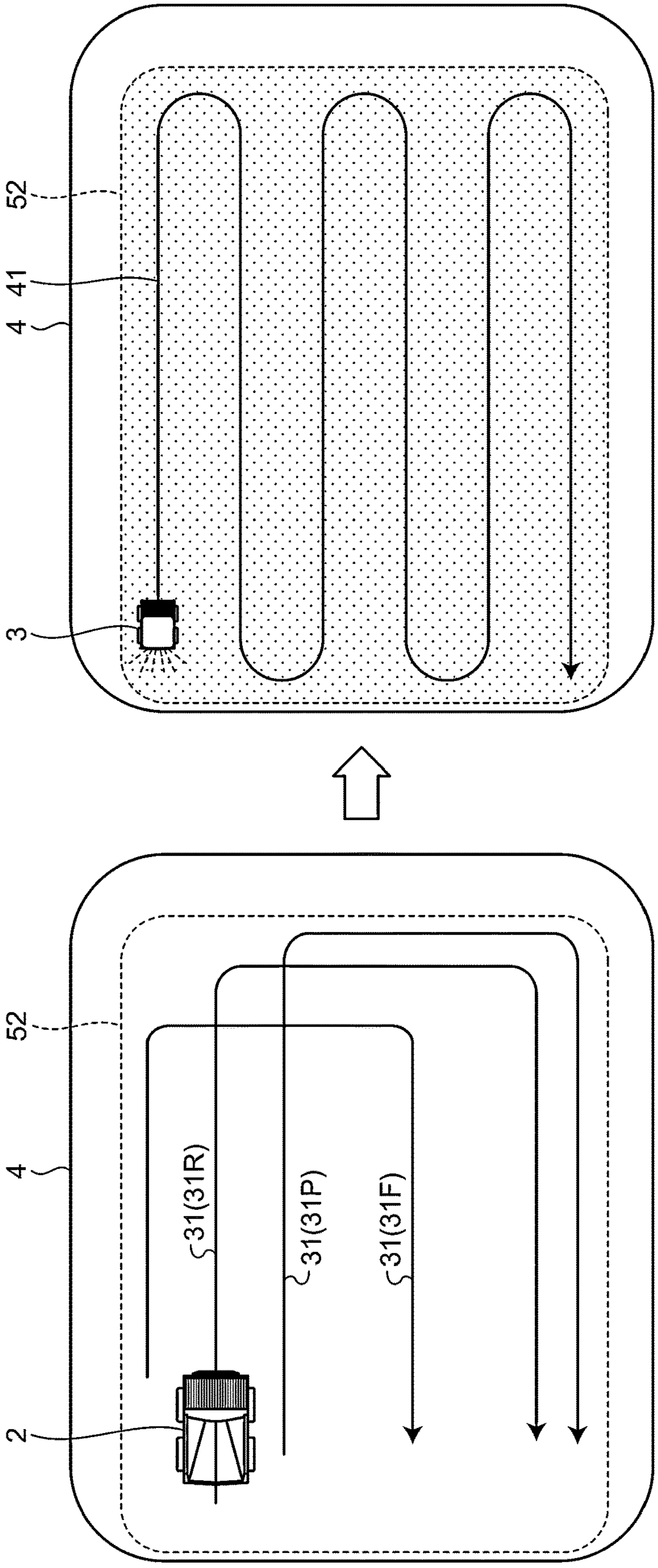
FIG. 10 is a schematic view for explaining a method for generating a wide-area water-sprinkling condition according to the embodiment.

FIG. 10 is a schematic view for explaining a method for generating the wide-area water-sprinkling condition according to the embodiment. As illustrated in FIG. 10, the target area designation unit 147 designates the second water-sprinkling area 52, that is a water-sprinkling target area, as the work area 4. The water-sprinkling condition generation unit 149 generates the wide-area water-sprinkling condition based on the second water-sprinkling area 52 designated by the target area designation unit 147. As illustrated in FIG. 10, a plurality of haul paths 31 may be set in the work area 4. In the example illustrated in FIG. 10, the haul path 31 includes a haul path 31R, a haul path 31P, and a haul path 31F. The haul path 31R is the haul path 31 of the unmanned haul vehicle 2 that traveled in the work area 4 before performing the water-sprinkling work. The haul path 31P is the haul path 31 of the unmanned haul vehicle 2 that traveled in the work area 4 in the past before the unmanned haul vehicle 2 that traveled in the haul path 31R. The haul path 31F is the haul path 31 of the unmanned haul vehicle 2 scheduled to travel in the work area 4 after the water-sprinkling work is performed. The haul path 31R is, for example, the haul path 31 of the target vehicle indicating the unmanned haul vehicle 2 for which the expected time Te is calculated. The haul path 31P is the haul path 31 of the past vehicle indicating the unmanned haul vehicle 2 that traveled in the work area 4 in the past before the target vehicle. The haul path 31F is the haul path 31 of the future vehicle indicating the unmanned haul vehicle 2 scheduled to travel in the work area 4 in the future than the target vehicle. The target area designation unit 147 designates the second water-sprinkling area 52 to include each of the haul path 31R, the haul path 31P, and the haul path 31F.

The water-sprinkling condition includes the water-sprinkling path 41 of the unmanned water-sprinkling vehicle 3. In generating the wide-area water-sprinkling condition, the water-sprinkling condition generation unit 149 generates the water-sprinkling path 41 so that the unmanned water-sprinkling vehicle 3 sprinkles water to the entire second water-sprinkling area 52. In the example illustrated in FIG. 10, the water-sprinkling condition generation unit 149 generates the water-sprinkling path 41 so that the unmanned water-sprinkling vehicle 3 repeats straight traveling and turning a plurality of times. The second water-sprinkling area 52 to be sprinkled with water under the wide-area water-sprinkling condition overlaps with a traveling area where the unmanned haul vehicle 2 traveling along each of the plurality of haul paths 31 (31R, 31P, and 31F) travels.

In the example illustrated in FIG. 10, the target area designation unit 147 designates the second water-sprinkling area 52 to include each of the haul path 31R, the haul path 31P, and the haul path 31F. The target area designation unit 147 may designate the second water-sprinkling area 52 to include the haul path 31R and the haul path 31P and not to include the haul path 31F. The target area designation unit 147 may designate the second water-sprinkling area 52 to include the haul path 31R and the haul path 31F and not to include the haul path 31P. The target area designation unit 147 may designate the second water-sprinkling area 52 to include the haul path 31P and the haul path 31F and not to include the haul path 31R. In addition, when there are a plurality of haul paths 31P of the past vehicle, the second water-sprinkling area 52 may be designated so that the second water-sprinkling area 52 includes each of the plurality of haul paths 31P.

Figure 11:
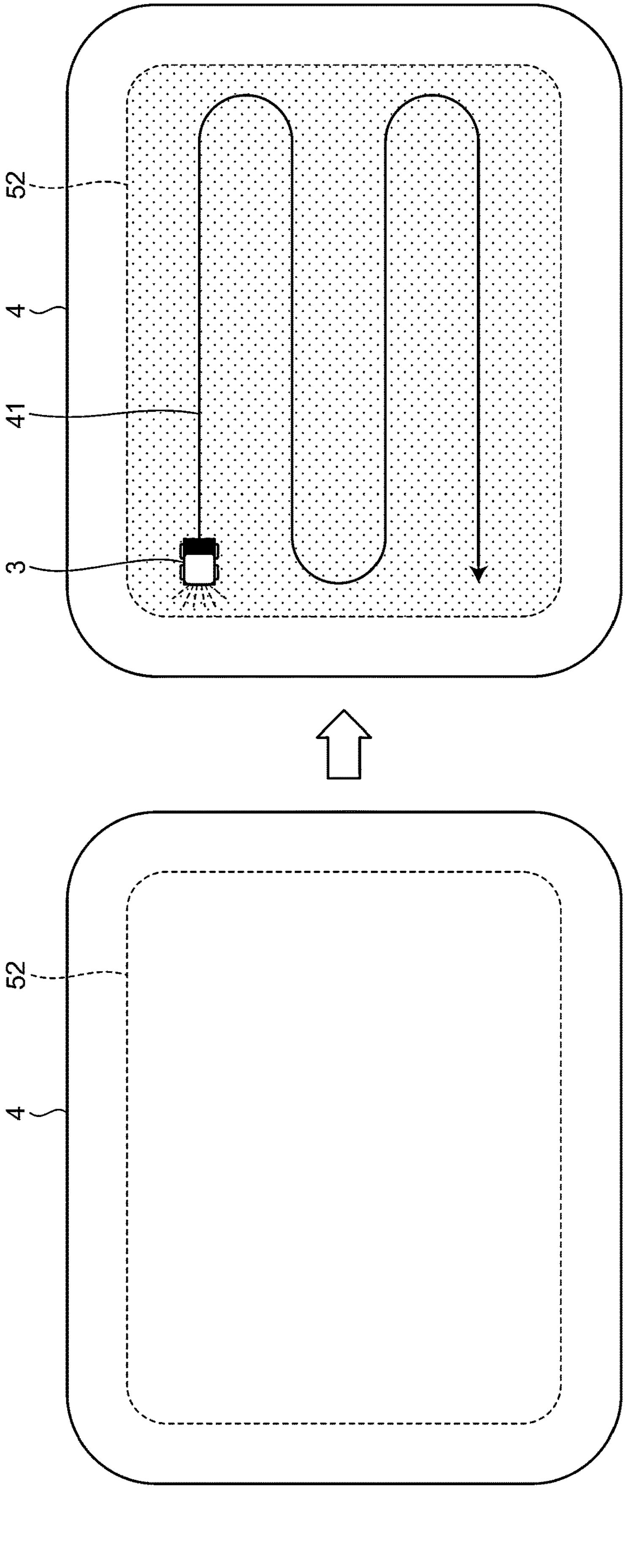
FIG. 11 is a schematic view for explaining the method for generating the wide-area water-sprinkling condition according to the embodiment.

FIG. 11 is a schematic view for explaining the method for generating the wide-area water-sprinkling condition according to the embodiment. As illustrated in FIG. 11, the target area designation unit 147 may designate the second water-sprinkling area 52 in the work area 4 based on the outer shape of the work area 4. The outer shape data indicating the outer shape of the work area 4 is acquired by the work area data acquisition unit 143. The target area designation unit 147 may designate the second water-sprinkling area 52 in which the outer shape of the work area 4 is reduced. The outer shape of the work area 4 and the outer shape of the second water-sprinkling area 52 may be similar. In generating the wide-area water-sprinkling condition, the water-sprinkling condition generation unit 149 may generate the water-sprinkling path 41 so that the entire second water-sprinkling area 52 designated based on the outer shape of the work area 4 is sprinkled with water by the unmanned water-sprinkling vehicle 3.

Figure 12:
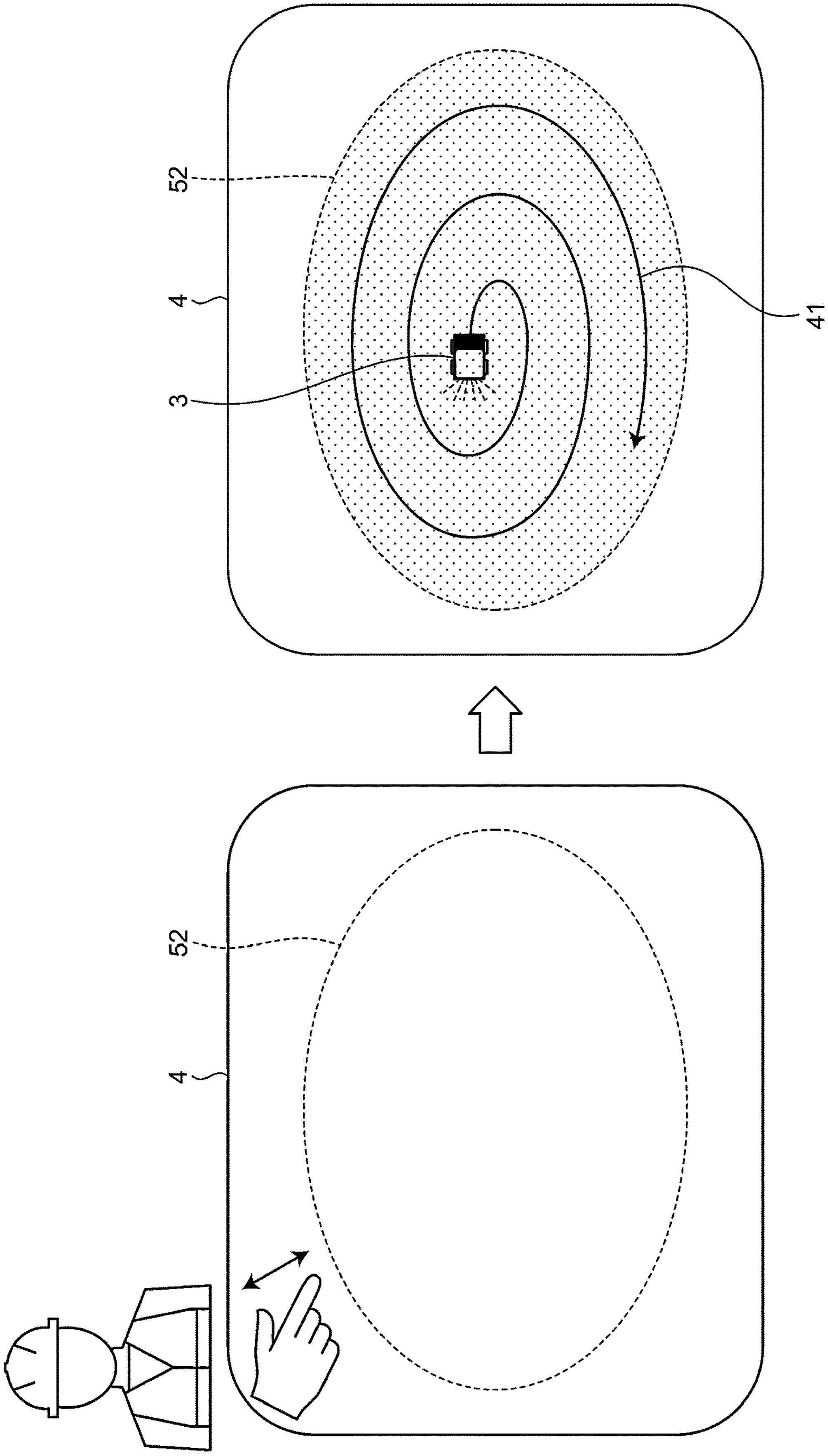
FIG. 12 is a schematic view for explaining the method for generating the wide-area water-sprinkling condition according to the embodiment.

FIG. 12 is a schematic view for explaining the method for generating the wide-area water-sprinkling condition according to the embodiment. As illustrated in FIG. 12, the target area designation unit 147 may designate the second water-sprinkling area 52 in the work area 4 based on designated input data from the input device 28. The manager can operate the input device 28 and designate the second water-sprinkling area 52 in the work area 4. In generating the wide-area water-sprinkling condition, the water-sprinkling condition generation unit 149 may generate the water-sprinkling path 41 so that the entire second water-sprinkling area 52 designated based on the input data from the input device 28 is sprinkled with water by the unmanned water-sprinkling vehicle 3. When the work area 4 is the loading station 4A, the driver may operate the input device 20 and designate the second water-sprinkling area 52 in the work area 4. The target area designation unit 147 may designate the second water-sprinkling area 52 in the work area 4 based on the designated input data from the input device 20. Note that the loading equipment 9 may exist as manned equipment in the loading station 4A, and a manned vehicle not having a bulldozer or working equipment (a light vehicle or the like) may exist as manned equipment in the soil discharging station 4B. When the work area 4 is the soil discharging station 4B, a driver of manned equipment such as a bulldozer or a manned vehicle may operate an input device provided in the manned equipment to designate the second water-sprinkling area 52 in the work area 4.

[Generation of Water-Sprinkling Path]

As described with reference to FIG. 9, the water-sprinkling condition generation unit 149 can automatically generate the water-sprinkling path 41 based on the haul path 31 of the unmanned haul vehicle 2. In addition, as described with reference to FIGS. 10, 11, and 12, the water-sprinkling condition generation unit 149 can automatically generate the water-sprinkling path 41 based on the second water-sprinkling area 52 that is the water-sprinkling target area. In the following description, the water-sprinkling path 41 automatically generated based on the haul path 31 indicating the target traveling route of the unmanned haul vehicle 2 or the second water-sprinkling area 52 designated as the work area 4 is appropriately referred to as an automatically generated path.

Figure 13:
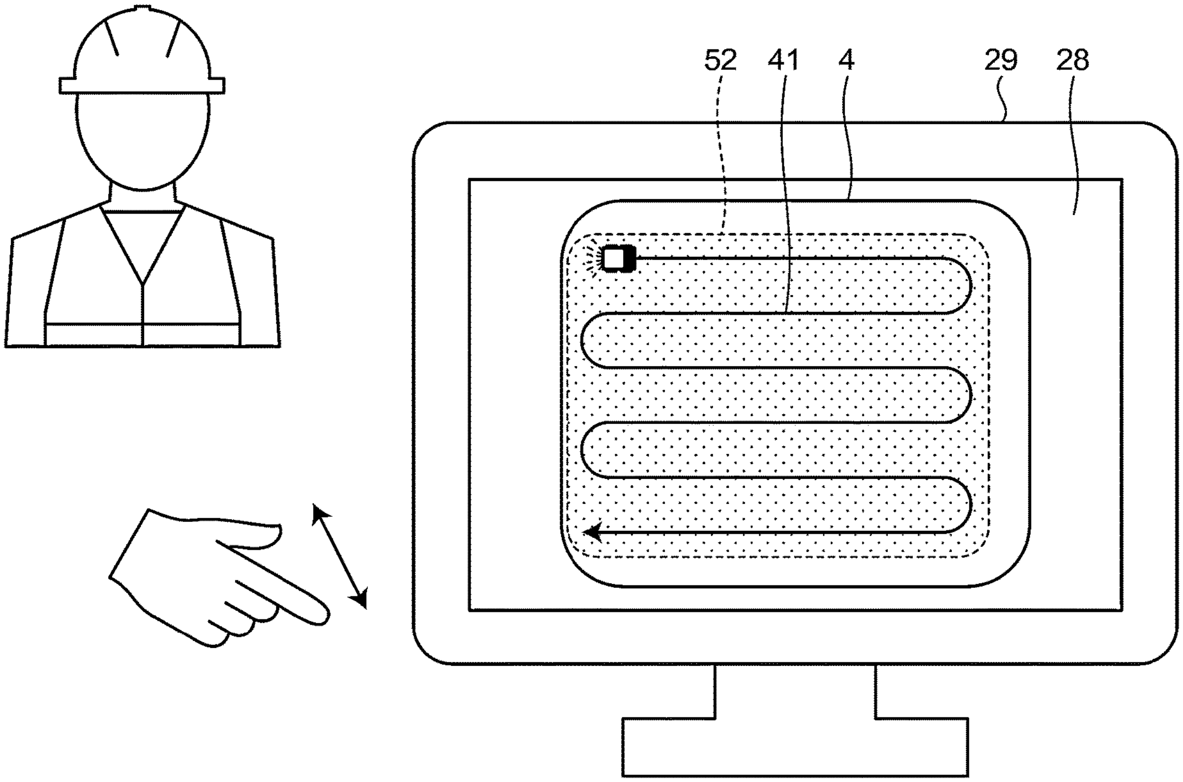
FIG. 13 is a schematic view for explaining a method for generating a water-sprinkling path according to the embodiment.

FIG. 13 is a schematic view for explaining a method for generating the water-sprinkling path 41 according to the embodiment. As illustrated in FIG. 13, the manager of the control facility 16 can operate the input device 28 and input the water-sprinkling path 41 to the management device 14. The input data acquisition unit 142 acquires path input data indicating input data of the water-sprinkling path 41 from the input device 28. The water-sprinkling condition generation unit 149 can generate the water-sprinkling path 41 based on the path input data acquired by the input data acquisition unit 142. In the generation of the water-sprinkling path 41, the display control unit 151 causes the display device 29 to display display data indicating the work area 4. While checking the work area 4 displayed on the display device 29, the manager can operate the input device 28 and generate the water-sprinkling path 41. Note that the water-sprinkling condition generation unit 149 may generate the water-sprinkling path 41 based on the path input data from the input device 20. In the generation of the water-sprinkling path 41, the display control unit 172 causes the display device 21 to display data indicating the work area 4. While checking the work area 4 displayed on the display device 21, the driver can operate the input device 20 and generate the water-sprinkling path 41. In the following description, the water-sprinkling path 41 generated based on the path input data from the input device 28 or the input device 20 is appropriately referred to as a manually generated path.

That is, in the embodiment, the water-sprinkling path 41 that can be generated by the water-sprinkling condition generation unit 149 includes a manually generated path generated based on the path input data acquired by the input data acquisition unit 142 and an automatically generated path generated based on the haul path 31 indicating the target traveling route of the unmanned haul vehicle 2 or the water-sprinkling target area designated as the work area 4.

When the manually generated path is generated, the water-sprinkling condition generation unit 149 does not generate the automatically generated path. When each of the manually generated path and the automatically generated path is generated in the water-sprinkling condition generation unit 149, the manually generated path may be preferentially used. When each of the manually generated path and the automatically generated path is generated in the water-sprinkling condition generation unit 149, the manually generated path may be enabled and the automatically generated path may be disabled.

[Decision of Water-Sprinkling Condition Based on Expected Time]

Figure 14:
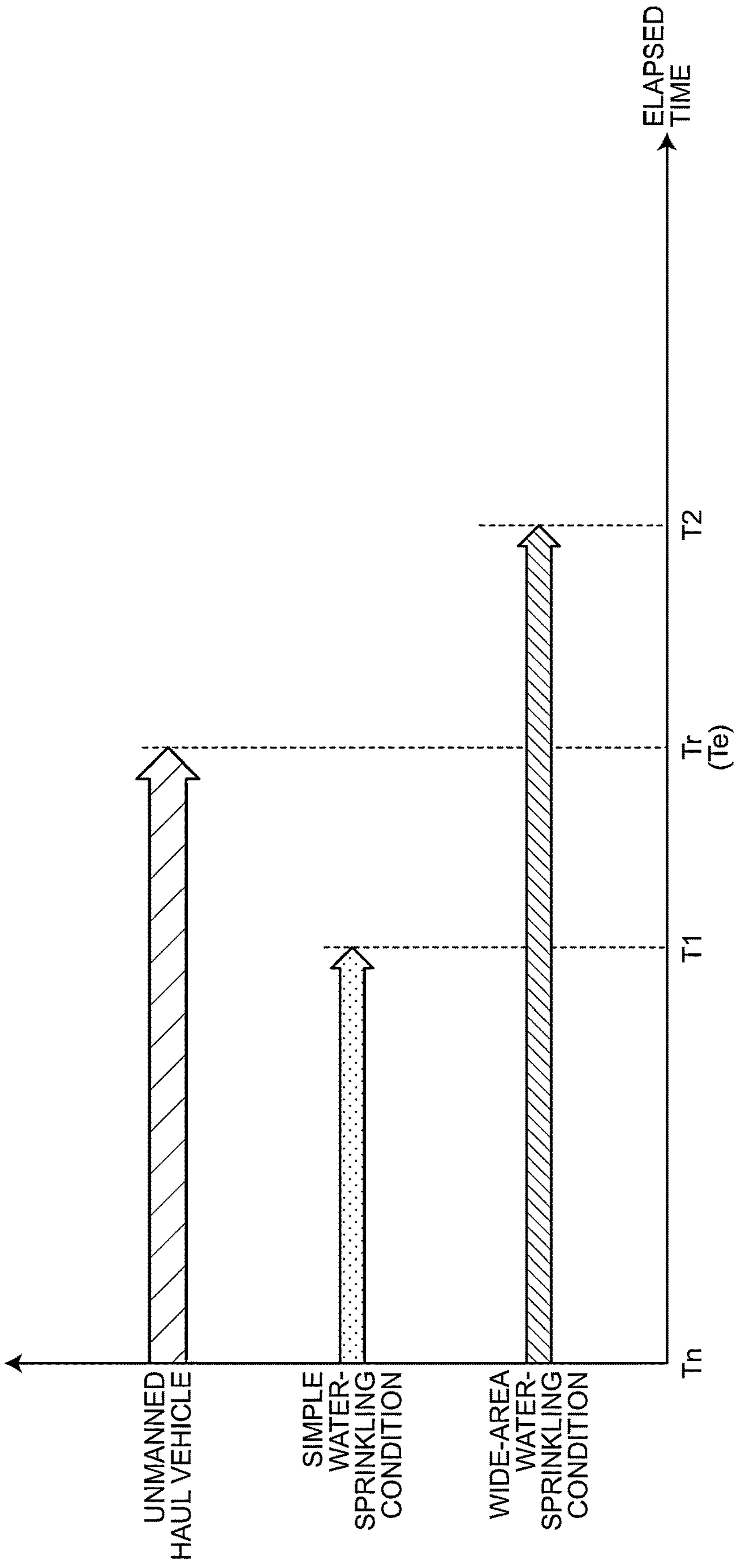
FIG. 14 is a diagram for explaining a method for deciding a water-sprinkling condition based on an expected time according to the embodiment.
Figure 15:
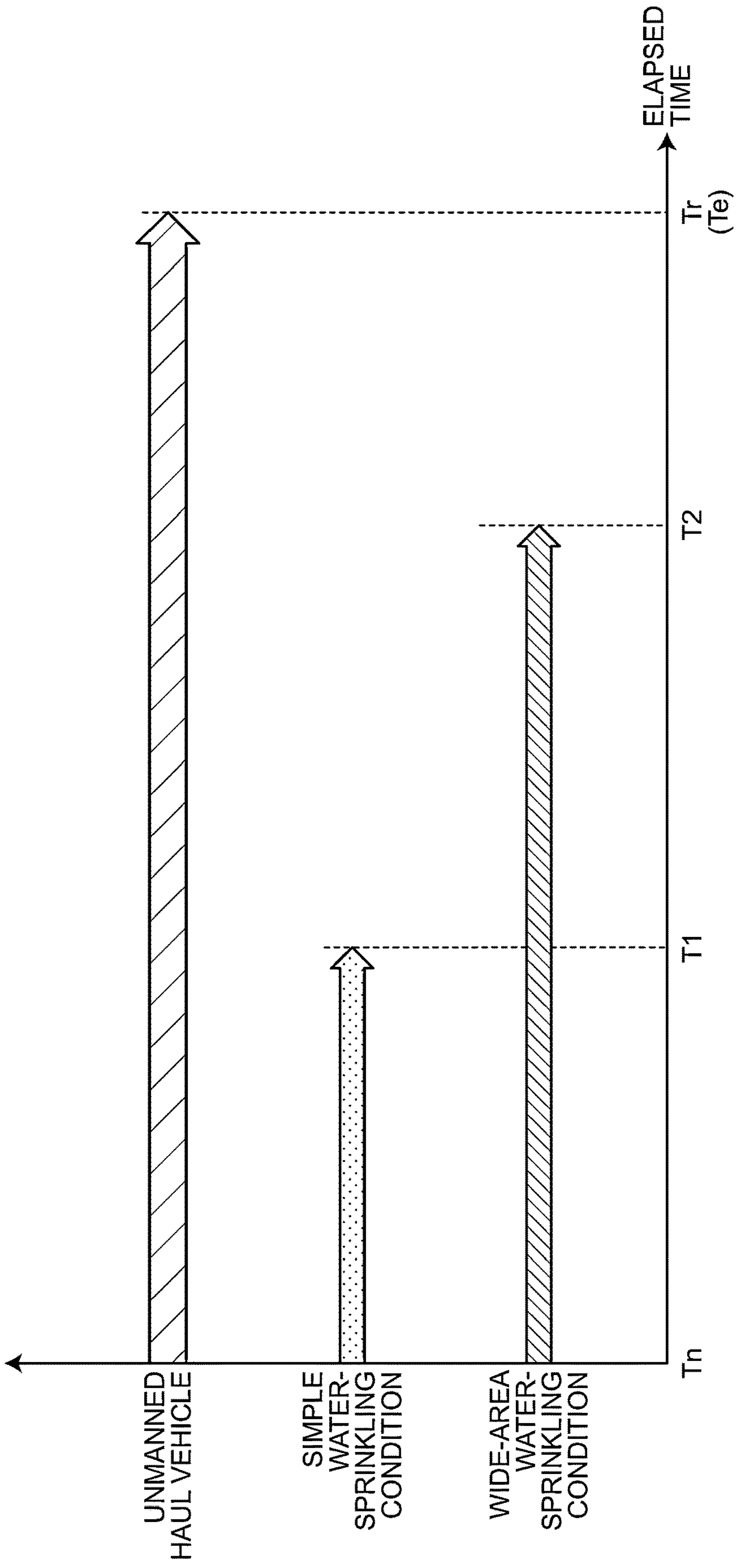
FIG. 15 is a diagram for explaining the method for deciding a water-sprinkling condition based on an expected time according to the embodiment.

Each of FIGS. 14 and 15 is a diagram for explaining a method for deciding the water-sprinkling condition based on the expected time Te according to the embodiment. As described with reference to FIG. 7, the expected time calculation unit 146 can calculate the expected time Te at which the unmanned haul vehicle 2 arrives at the work area 4 or the required time Tr. The simple water-sprinkling condition is a water-sprinkling condition requiring the first time T1 from the start of water sprinkling to the end of water sprinkling. The wide-area water-sprinkling condition is a water-sprinkling condition requiring the second time T2 longer than the first time T1 from the start of water sprinkling to the end of water sprinkling.

In FIGS. 14 and 15, a horizontal axis represents the elapsed time from the time point Tn at which the current position Pn of the unmanned haul vehicle 2 is detected. The expected time calculation unit 146 calculates the expected time Te or the required time Tr before the water sprinkling of the unmanned water-sprinkling vehicle 3 is started. The water-sprinkling condition decision unit 148 decides the water-sprinkling condition so that the water sprinkling ends by the expected time Te. FIGS. 14 and 15 describe the relationship among the required time Tr, the first time T1, and the second time T2 when the water sprinkling is started at the time point Tn.

As illustrated in FIG. 14, when the wide-area water-sprinkling condition is a water-sprinkling condition in which the water sprinkling does not end by the expected time Te, and the simple water-sprinkling condition is a water-sprinkling condition in which the water sprinkling ends by the expected time Te, the water-sprinkling condition decision unit 148 decides the first water-sprinkling condition as the water-sprinkling condition. That is, when the required time Tr is shorter than the second time T2 and longer than the first time T1, the water-sprinkling condition decision unit 148 decides the first water-sprinkling condition as the water-sprinkling condition.

As illustrated in FIG. 15, when both the simple water-sprinkling condition and the wide-area water-sprinkling condition are water-sprinkling conditions in which the water sprinkling ends by the expected time Te, the water-sprinkling condition decision unit 148 decides the second water-sprinkling condition as the water-sprinkling condition. That is, when the required time Tr is longer than the first time T1 and the second time T2, the water-sprinkling condition decision unit 148 decides the second water-sprinkling condition as the water-sprinkling condition.

In addition, as described later, when the required time Tr is shorter than the first time T1 and it is not necessary to sprinkle water, the water-sprinkling condition decision unit 148 decides the non-water-sprinkling condition as the water-sprinkling condition. For example, water sprinkling may be determined to be unnecessary based on a water-sprinkling history of the work area 4. For example, when an elapsed time from the latest water-sprinkling work is short, water sprinkling may be determined to be unnecessary. In addition, water sprinkling may be determined to be unnecessary based on a generation status of mine dust or cloud of dust in the work area 4. For example, when laser measuring equipment capable of detecting mine dust or cloud of dust is installed in the work area 4, and when it is determined that a generation amount of mine dust or cloud of dust is small based on a measurement result of the laser measuring instrument, water sprinkling may be determined to be unnecessary.

Note that not only the expected time Te (required time Tr) but also other factors may be considered in deciding the water-sprinkling condition. For example, the water-sprinkling condition may be decided based on at least one of the water-sprinkling history of the work area 4, the generation status of mine dust or cloud of dust, and a road surface situation of the work area 4.

[Method for Managing Workplace]

Figure 16:
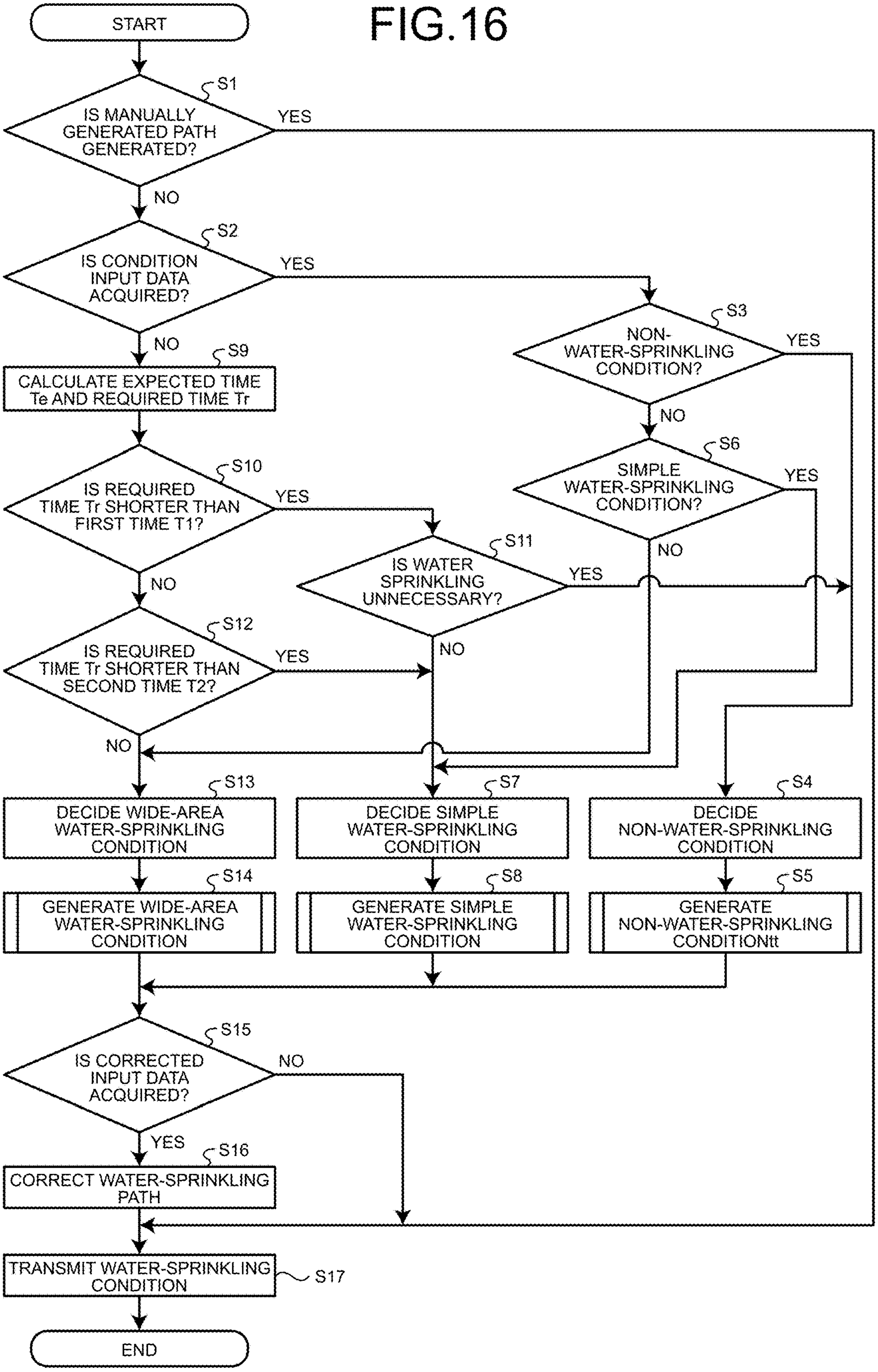
FIG. 16 is a flowchart illustrating a method for managing the workplace according to the embodiment.
Figure 17:
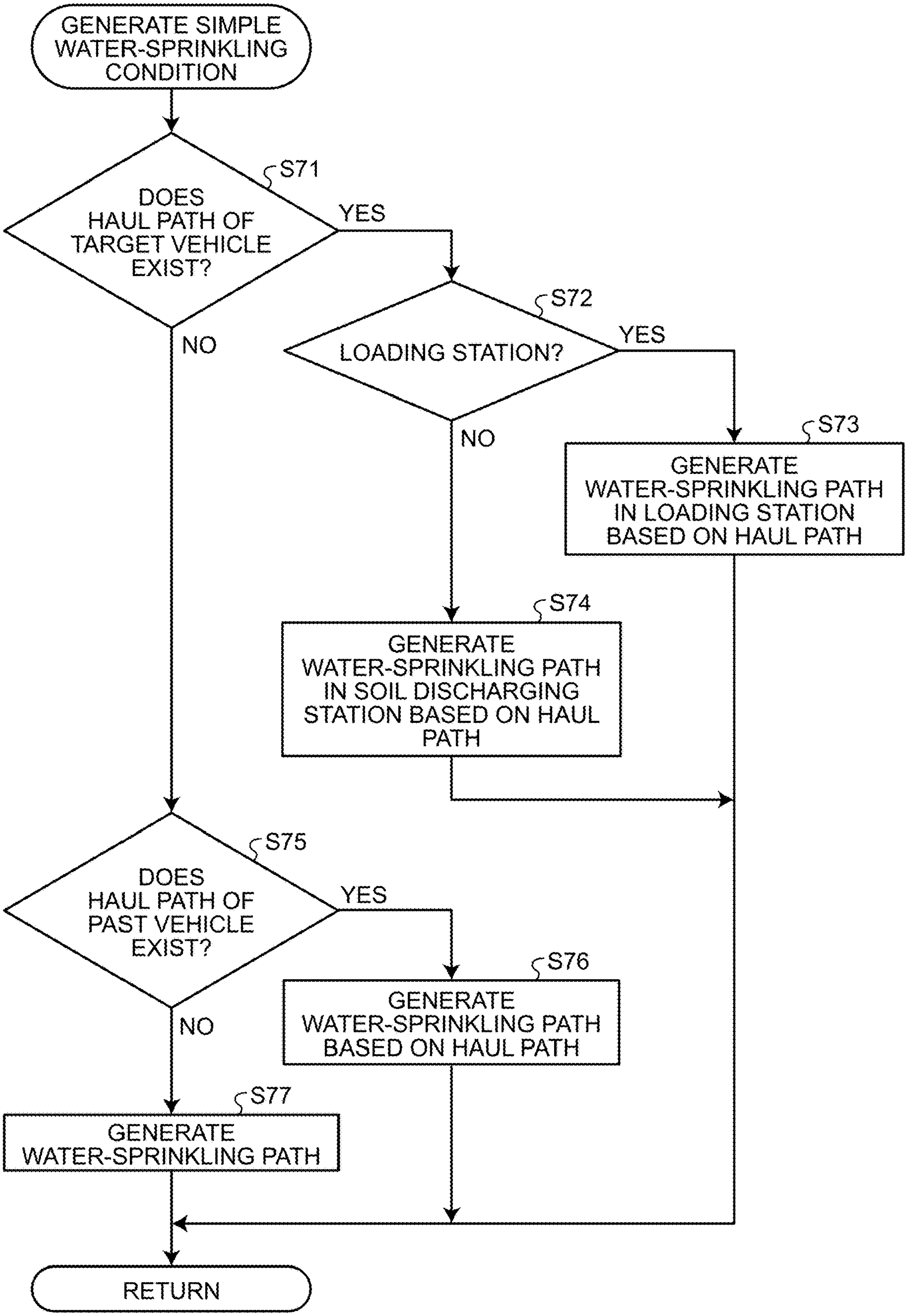
FIG. 17 is a flowchart illustrating the method for generating the simple water-sprinkling condition according to the embodiment.
Figure 18:
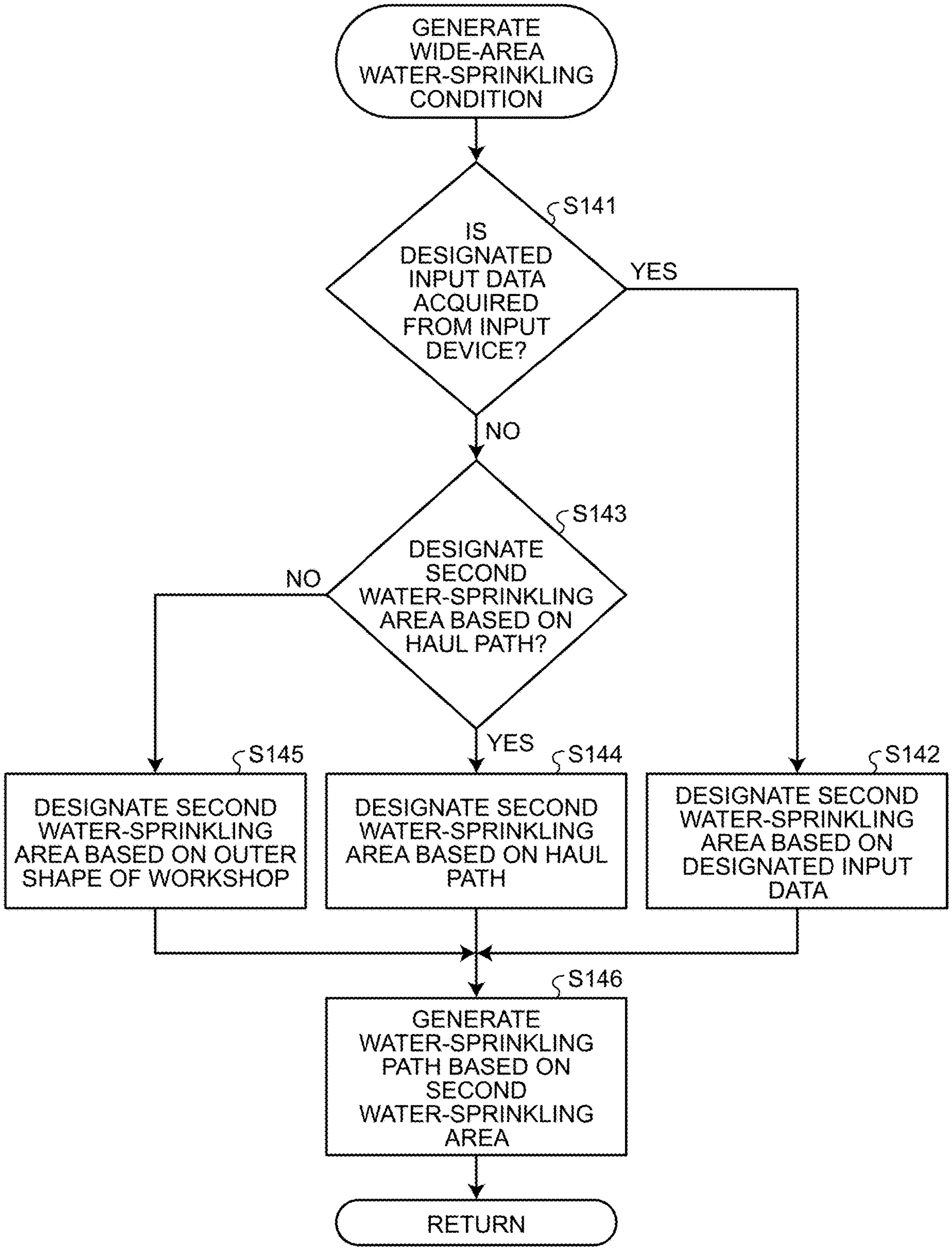
FIG. 18 is a flowchart illustrating the method for generating the wide-area water-sprinkling condition according to the embodiment.

FIG. 16 is a flowchart illustrating a method for managing the workplace 1 according to the embodiment. FIG. 17 is a flowchart illustrating the method for generating the simple water-sprinkling condition according to the embodiment. FIG. 18 is a flowchart illustrating the method for generating the wide-area water-sprinkling condition according to the embodiment. In the following description, the input data acquisition unit 142 acquires input data from the input device 28. As described above, the input data acquisition unit 142 can also acquire input data from the input device 20.

The water-sprinkling condition generation unit 149 determines whether a manually generated path is generated (step S1). In step S1, when it is determined that the manually generated path is generated (step S1: Yes), the water-sprinkling condition transmission unit 150 transmits the water-sprinkling condition including the manually generated path to the unmanned water-sprinkling vehicle 3 (step S17). The unmanned water-sprinkling vehicle 3 sprinkles water to the work area 4 while traveling along the manually generated path.

When it is determined in step S1 that the manually generated path is not generated (step S1: No), the input data acquisition unit 142 determines whether condition input data for deciding the water-sprinkling condition is acquired from the input device 28 (step S2).

Figure 19:
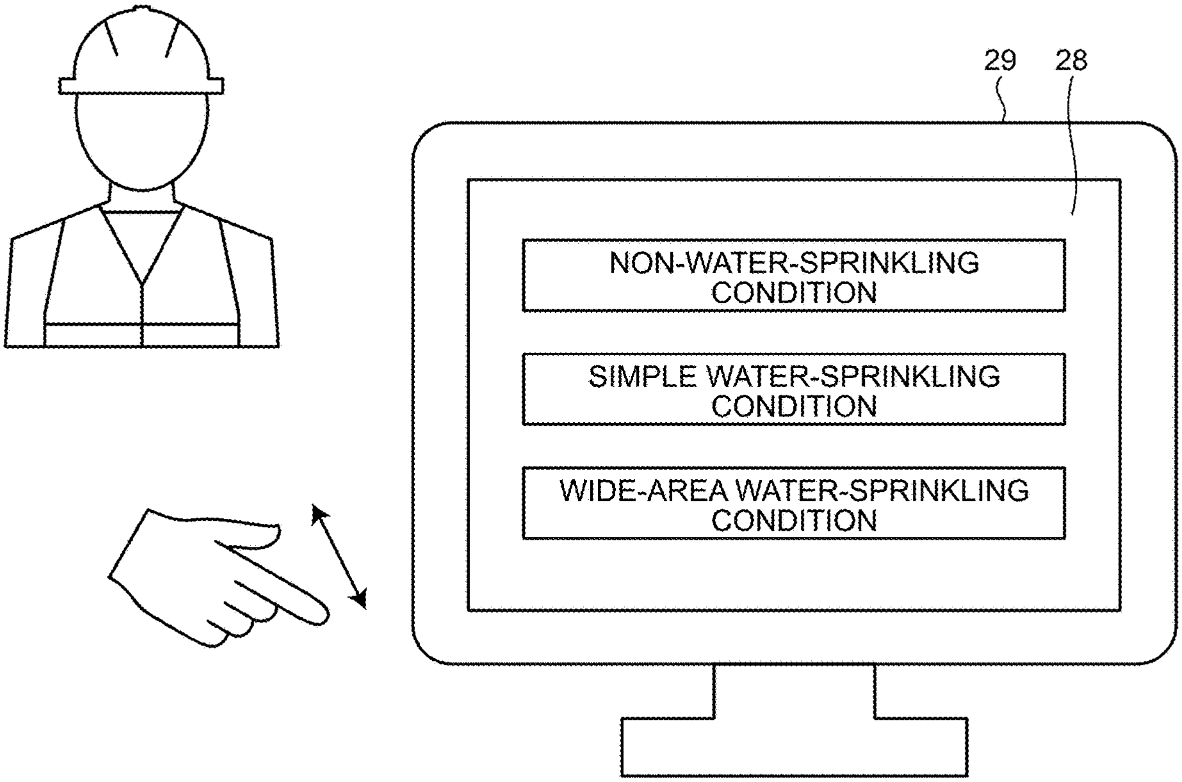
FIG. 19 is a schematic view illustrating a method for inputting a water-sprinkling condition according to the embodiment.

FIG. 19 is a schematic view illustrating a method for inputting a water-sprinkling condition according to the embodiment. The manager of the control facility 16 can operate the input device 28 and input condition input data indicating the water-sprinkling condition of the unmanned water-sprinkling vehicle 3 to the management device 14. The condition input data includes condition input data indicating the non-water-sprinkling condition, condition input data indicating the simple water-sprinkling condition, and condition input data indicating the wide-area water-sprinkling condition. The manager can select an optional water-sprinkling condition from candidates of the non-water-sprinkling condition, the simple water-sprinkling condition, and the wide-area water-sprinkling condition displayed on the display device 29.

In step S2, when it is determined that the condition input data is not acquired (step S2: No), the expected time calculation unit 146 calculates the expected time Te at which the unmanned haul vehicle 2 arrives at the work area 4 and the required time Tr (step S9).

The water-sprinkling condition decision unit 148 determines whether the required time Tr is shorter than the first time T1 required for the simple water-sprinkling condition (step S10).

In step S10, when it is determined that the required time Tr is shorter than the first time T1 (step S10: Yes), the water-sprinkling condition decision unit 148 determines whether water sprinkling is unnecessary (step S11). In step S11, when it is determined that water sprinkling is unnecessary (step S11: Yes), the water-sprinkling condition decision unit 148 decides the non-water-sprinkling condition as the water-sprinkling condition (step S4). The water-sprinkling condition generation unit 149 generates the non-water-sprinkling condition decided by the water-sprinkling condition decision unit 148 (step S5). The water-sprinkling condition generation unit 149 generates the water-sprinkling path 41 of the non-water-sprinkling condition.

After the water-sprinkling path 41 is generated, the manager in the control facility 16 can operate the input device 28 and correct the water-sprinkling path 41. Note that the driver of the loading equipment 9 may operate the input device 20 and correct the water-sprinkling path 41. In addition, a driver of a manned vehicle (such as a light vehicle) having no bulldozer or working equipment may operate the input device and correct the water-sprinkling path 41. When the water-sprinkling path 41 is corrected by the manager or the driver, the input data acquisition unit 142 acquires, from the input device 28, corrected input data indicating input data for correcting the water-sprinkling path 41. The input data acquisition unit 142 determines whether the corrected input data is acquired from the input device 28 (step S15).

When it is determined in step S15 that the corrected input data is acquired (step S15: Yes), the water-sprinkling condition generation unit 149 corrects the water-sprinkling path 41 based on the corrected input data (step S16).

The water-sprinkling condition transmission unit 150 transmits the water-sprinkling condition including the corrected water-sprinkling path 41 to the unmanned water-sprinkling vehicle 3 (step S17). In step S15, when it is determined that the corrected input data is not acquired (step S15: No), the water-sprinkling condition generation unit 149 transmits the water-sprinkling path 41 generated in step S5 to the unmanned water-sprinkling vehicle 3 (step S17).

Figure 20:
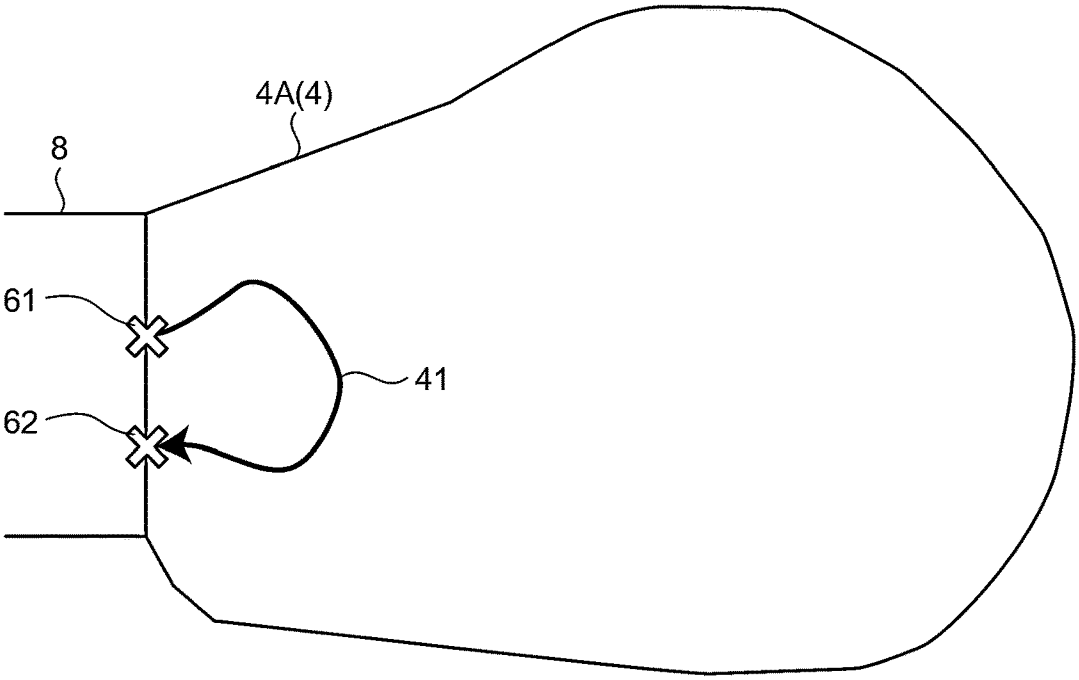
FIG. 20 is a schematic view illustrating a method for generating a non-water-sprinkling condition according to the embodiment.

FIG. 20 is a schematic view illustrating a method for generating the non-water-sprinkling condition according to the embodiment. FIG. 20 illustrates the method for generating the non-water-sprinkling condition in the loading station 4A. As illustrated in FIG. 20, an entrance point 61 and an exit point 62 are set in the loading station 4A. Each of the entrance point 61 and the exit point 62 may be set by a manager. The manager can operate the input device 28 and set each of the entrance point 61 and the exit point 62. The unmanned water-sprinkling vehicle 3 travels from the outside of the loading station 4A toward the loading station 4A. For example, the unmanned water-sprinkling vehicle 3 may travel on the traveling path 8 from at least one of the parking lot 5, the fuel filling station 6, and the water supply station 7 toward the loading station 4A. The unmanned water-sprinkling vehicle 3 enters the loading station 4A from the entrance point 61. In the case of the non-water-sprinkling condition, the water-sprinkling condition generation unit 149 generates the water-sprinkling path 41 so that the unmanned water-sprinkling vehicle 3 entering the loading station 4A exits from the loading station 4A in a short time as possible. The unmanned water-sprinkling vehicle 3 travels in the loading station 4A along the water-sprinkling path 41. In the non-water-sprinkling condition, the unmanned water-sprinkling vehicle 3 leaves the loading station 4A via the exit point 62 without sprinkling water to the loading station 4A.

In step S11, when it is determined that water sprinkling is necessary (step S11: No), the water-sprinkling condition decision unit 148 decides the simple water-sprinkling condition as the water-sprinkling condition (step S7). The water-sprinkling condition generation unit 149 generates the simple water-sprinkling condition decided by the water-sprinkling condition decision unit 148 (step S8).

As illustrated in FIG. 17, in the generation of the simple water-sprinkling condition, the water-sprinkling condition generation unit 149 determines whether the haul path 31 of the target vehicle indicating the unmanned haul vehicle 2 for which the expected time Te and the required time Tr are calculated exists in the work area 4 (step S71).

In step S71, when it is determined that the haul path 31 of the target vehicle exists (step S71: Yes), the water-sprinkling condition generation unit 149 determines whether the work area 4 where the haul path 31 exists is the loading station 4A (step S72). In step S72, when it is determined that the work area 4 where the haul path 31 exists is the loading station 4A (step S72: Yes), the water-sprinkling condition generation unit 149 generates the water-sprinkling path 41 in the loading station 4A based on the haul path 31 (step S73). After the water-sprinkling path 41 of the simple water-sprinkling condition is generated, the processes of steps S15, S16, and S17 are performed.

Figure 21:
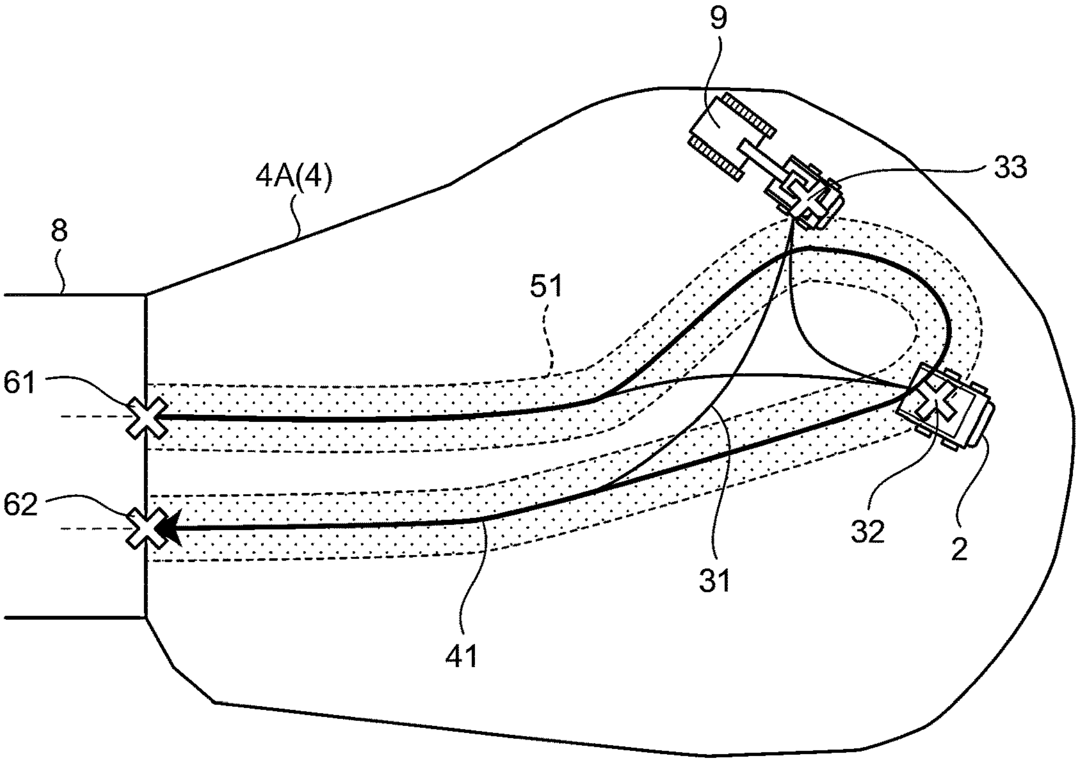
FIG. 21 is a schematic view illustrating the method for generating the simple water-sprinkling condition according to the embodiment.
Figure 22:
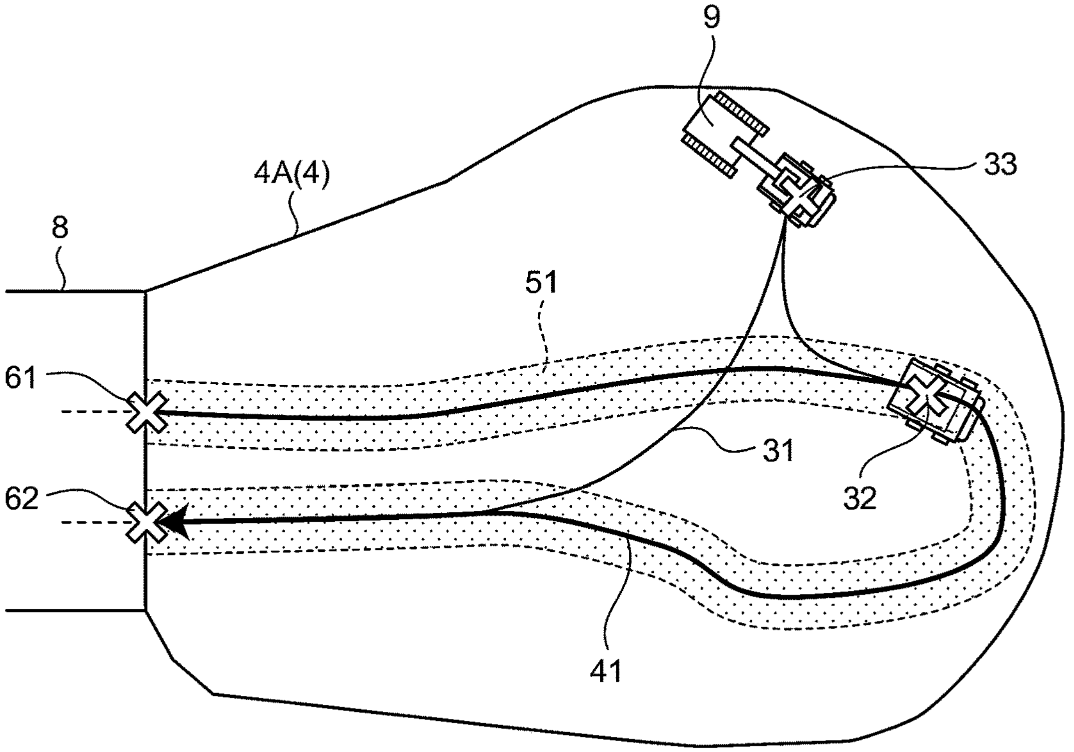
FIG. 22 is a schematic view illustrating the method for generating the simple water-sprinkling condition according to the embodiment.

Each of FIGS. 21 and 22 is a schematic view illustrating the method for generating the simple water-sprinkling condition according to the embodiment. Each of FIGS. 21 and 22 illustrates the method for generating the simple water-sprinkling condition in the loading station 4A. As illustrated in FIGS. 21 and 22, the entrance point 61, the exit point 62, a switchback point 32, and a loading point 33 are set in the loading station 4A. Switchback refers to an operation in which the unmanned haul vehicle 2 moving forward changes a traveling direction and travels in the target direction while moving backward. The switchback point 32 refers to a position where switchback is performed. The loading point 33 refers to a position where the unmanned haul vehicle 2 on which the loading work is performed is disposed. The loading point 33 is set in the vicinity of the loading equipment 9. At least one of the entrance point 61, the switchback point 32, the loading point 33, and the exit point 62 may be set by a manager. The haul condition generation unit 144 generates the haul path 31 so that the unmanned haul vehicle 2 passes each of the entrance point 61, the switchback point 32, the loading point 33, and the exit point 62.

The unmanned haul vehicle 2 that traveled on the traveling path 8 and passed the entrance point 61 enters the loading station 4A while moving forward. The unmanned haul vehicle 2 that entered the loading station 4A switches back at the switchback point 32, and then enters the loading point 33 while moving backward. The loading equipment 9 loads a load onto the dump body 2C of the unmanned haul vehicle 2 disposed at the loading point 33. The unmanned haul vehicle 2 that finished the loading work moves forward to the exit point 62. The unmanned haul vehicle 2 passes the exit point 62 while moving forward and exits from the loading station 4A.

The water-sprinkling condition generation unit 149 generates the simple water-sprinkling condition based on the haul path 31. The water-sprinkling condition generation unit 149 generates the water-sprinkling path 41 so that at least a part of the haul path 31 and the water-sprinkling path 41 coincide with each other. The water-sprinkling condition generation unit 149 generates the water-sprinkling path 41 so that a scanning rate on the haul path 31 becomes as high as possible without disturbing the work of the loading equipment 9 (manned equipment). FIG. 21 illustrates an example in which the water-sprinkling path 41 is generated as close as possible to the loading point 33. FIG. 22 illustrates an example in which the water-sprinkling path 41 is generated to pass at least the switchback point 32. The unmanned water-sprinkling vehicle 3 sprinkles water while traveling along the water-sprinkling path 41 illustrated in FIG. 21 or 22. The first water-sprinkling area 51 in the simple water-sprinkling condition overlaps at least a part of the haul path 31.

In step S72, when it is determined that the work area 4 where the haul path 31 exists is the soil discharging station 4B (step S72: No), the water-sprinkling condition generation unit 149 generates the water-sprinkling path 41 in the soil discharging station 4B based on the haul path 31 (step S74). After the water-sprinkling path 41 of the simple water-sprinkling condition is generated, the processes of steps S15, S16, and S17 are performed.

Figure 23:
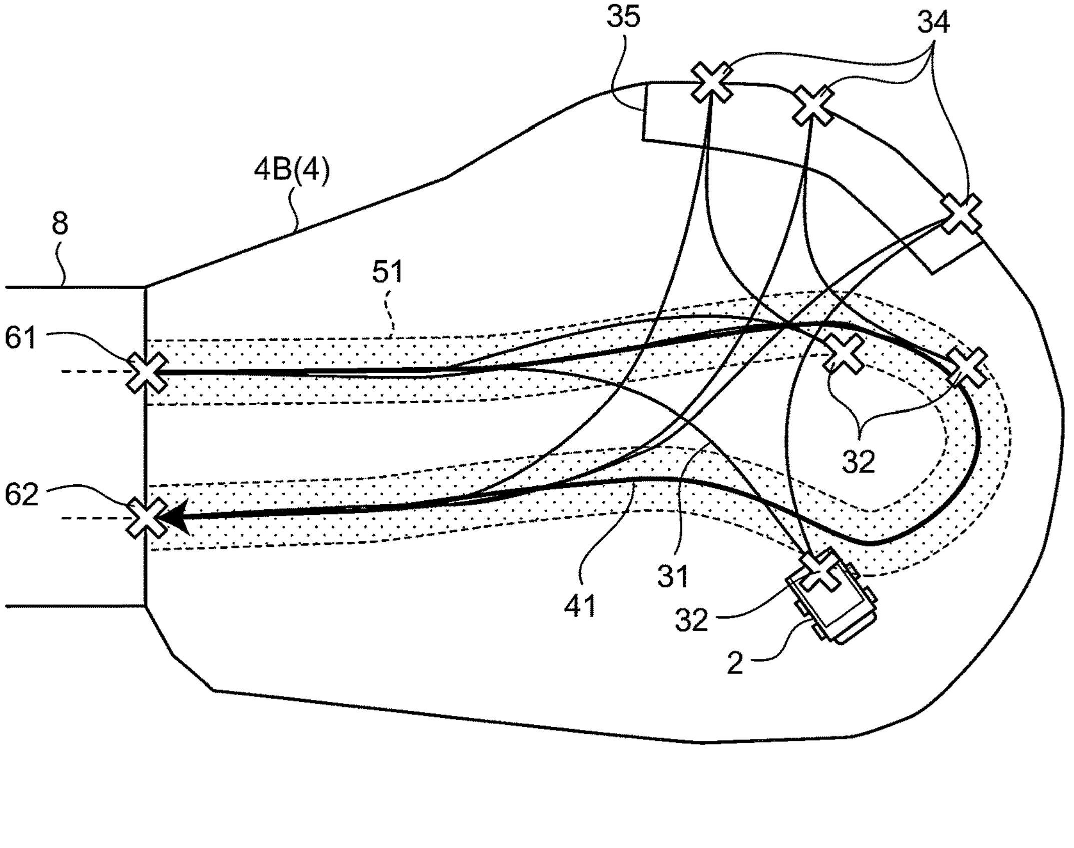
FIG. 23 is a schematic view illustrating the method for generating the simple water-sprinkling condition according to the embodiment.

FIG. 23 is a schematic view illustrating the method for generating the simple water-sprinkling condition according to the embodiment. FIG. 23 illustrates the method for generating the simple water-sprinkling condition in the soil discharging station 4B. As illustrated in FIG. 23, the entrance point 61, the exit point 62, the switchback point 32, a soil discharging point 34, and a soil discharging area 35 are set in the soil discharging station 4B. The soil discharging area 35 is an area where the unmanned haul vehicle 2 can discharge the load. The soil discharging point 34 refers to a position where the unmanned haul vehicle 2 that performs the soil discharging work is disposed. In the example illustrated in FIG. 23, a plurality of soil discharging points 34 are set. The soil discharging point 34 is set inside the soil discharging area 35. At least one of the entrance point 61, the switchback point 32, the soil discharging point 34, the soil discharging area 35, and the exit point 62 may be set by a manager. The haul condition generation unit 144 generates the haul path 31 so that the unmanned haul vehicle 2 passes each of the entrance point 61, the switchback point 32, the soil discharging point 34, and the exit point 62.

The unmanned haul vehicle 2 that traveled on the traveling path 8 and passed the entrance point 61 enters the soil discharging station 4B while moving forward. The unmanned haul vehicle 2 that entered the soil discharging station 4B switches back at the switchback point 32, and then enters the soil discharging point 34 while moving backward. The unmanned haul vehicle 2 that entered the soil discharging point 34 performs the soil discharging work of discharging a load from the dump body 2C by causing the dump body 2C to perform a dumping operation. The unmanned haul vehicle 2 that finished the soil discharging work moves forward to the exit point 62. The unmanned haul vehicle 2 passes the exit point 62 while moving forward and exits from the soil discharging station 4B.

The water-sprinkling condition generation unit 149 generates the simple water-sprinkling condition based on the haul path 31. The water-sprinkling condition generation unit 149 generates the water-sprinkling path 41 so that at least a part of the haul path 31 and the water-sprinkling path 41 coincide with each other. The water-sprinkling condition generation unit 149 generates the water-sprinkling path 41 to overlap, for example, the haul path 31 on which water sprinkling is not performed in the past among the plurality of haul paths 31. The unmanned water-sprinkling vehicle 3 sprinkles water while traveling along the water-sprinkling path 41 illustrated in FIG. 23. The first water-sprinkling area 51 in the simple water-sprinkling condition overlaps at least a part of the haul path 31.

In step S71, when it is determined that the haul path 31 of the target vehicle does not exist (step S71: No), the water-sprinkling condition generation unit 149 determines whether the haul path 31 of the past vehicle exists (step S75). In step S75, when it is determined that the haul path 31 of the past vehicle exists (step S75: Yes), the water-sprinkling condition generation unit 149 generates the water-sprinkling path 41 based on the haul path 31 of the past vehicle (step S76). The water-sprinkling condition generation unit 149 generates the water-sprinkling path 41 so that at least a part of the haul path 31 of the past vehicle and the water-sprinkling path 41 coincide with each other. After the water-sprinkling path 41 of the simple water-sprinkling condition is generated, the processes of steps S15, S16, and S17 are performed.

In step S75, when it is determined that the haul path 31 of the past vehicle does not exist (step S75: No), the water-sprinkling condition generation unit 149 generates the water-sprinkling path 41 not based on the haul path 31 (step S77). After the water-sprinkling path 41 of the simple water-sprinkling condition is generated, the processes of steps S15, S16, and S17 are performed.

Figure 24:
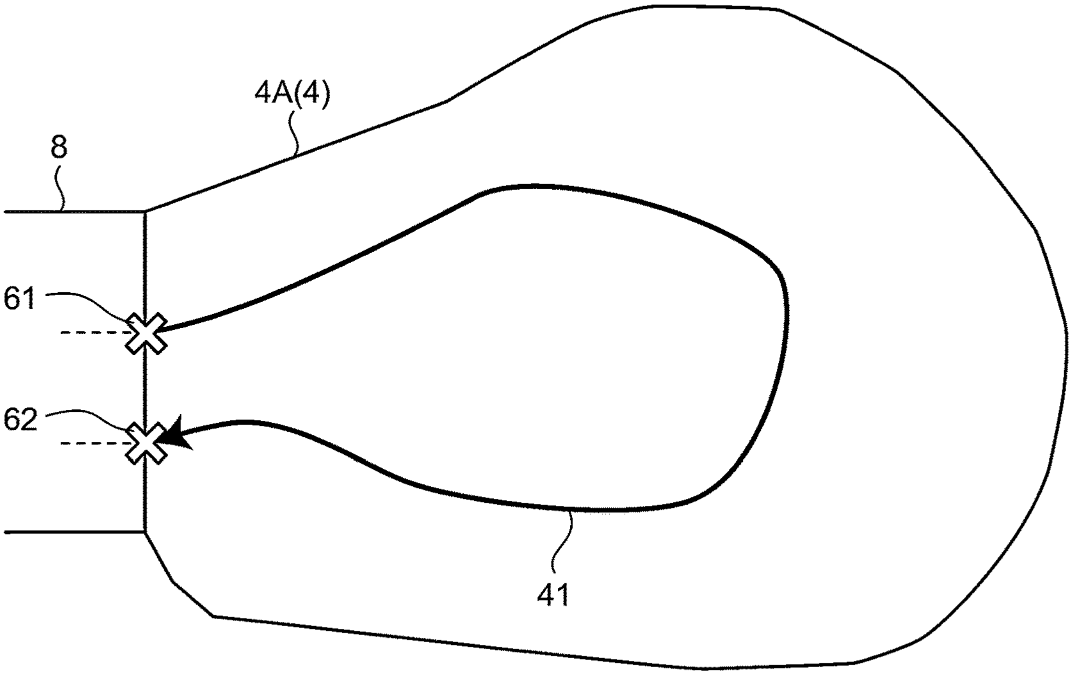
FIG. 24 is a schematic view illustrating the method for generating the simple water-sprinkling condition according to the embodiment.

FIG. 24 is a schematic view illustrating the method for generating the simple water-sprinkling condition according to the embodiment. As illustrated in FIG. 24, the water-sprinkling path 41 is generated to extend deep into the work area 4 from the entrance point 61 and then head toward the exit point 62.

When it is determined in step S10 that the required time Tr is longer than or equal to the first time T1 (step S10: No), the water-sprinkling condition decision unit 148 determines whether the required time Tr is shorter than the second time T2 (step S12).

In step S12, when it is determined that the required time Tr is shorter than the second time T2 (step S12: Yes), the water-sprinkling condition decision unit 148 performs the process of step S7. In step S12, when it is determined that the required time Tr is longer than or equal to the second time T2 (step S12: No), the water-sprinkling condition decision unit 148 decides the wide-area water-sprinkling condition as the water-sprinkling condition (step S13). The water-sprinkling condition generation unit 149 generates the wide-area water-sprinkling condition decided by the water-sprinkling condition decision unit 148 (step S14).

As illustrated in FIG. 18, in the generation of the wide-area water-sprinkling condition, the input data acquisition unit 142 determines whether the designated input data is acquired from the input device 28 (step S141). When it is determined in step S141 that the designated input data is acquired (step S141: Yes), the target area designation unit 147 designates the second water-sprinkling area 52 based on the designated input data (step S142). When it is determined in step S142 that the designated input data is not acquired (step S141: No), the target area designation unit 147 determines whether to designate the second water-sprinkling area 52 based on the haul path 31 (step S143). When it is determined in step S143 to designate the second water-sprinkling area 52 based on the haul path 31 (step S143: Yes), the target area designation unit 147 designates the second water-sprinkling area 52 based on the haul path 31 (step S144). When it is determined in step S143 not to designate the second water-sprinkling area 52 based on the haul path 31 (step S143: No), the target area designation unit 147 designates the second water-sprinkling area 52 based on the outer shape of the work area 4 (step S145).

The water-sprinkling condition generation unit 149 generates the water-sprinkling path 41 based on the second water-sprinkling area 52 designated in any one of steps S142, S144, and S145 (step S146). After the water-sprinkling path 41 of the wide-area water-sprinkling condition is generated, the processes of steps S15, S16, and S17 are performed.

Figure 25:
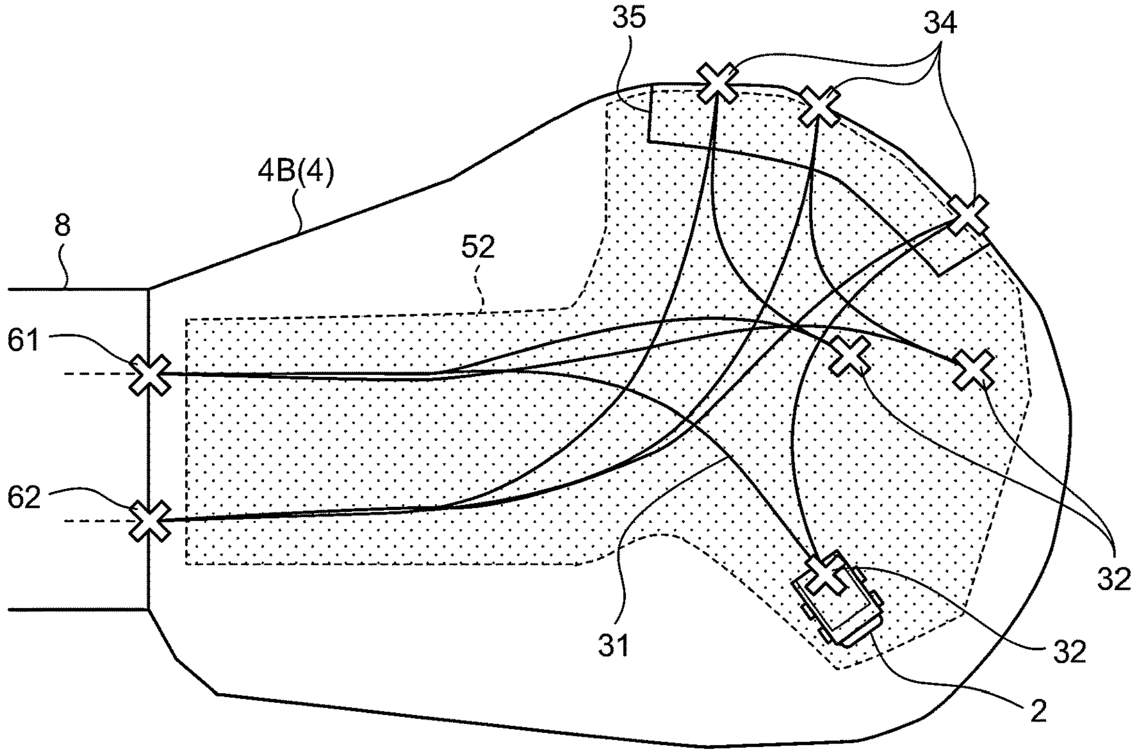
FIG. 25 is a schematic view illustrating the method for generating the wide-area water-sprinkling condition according to the embodiment.
Figure 26:
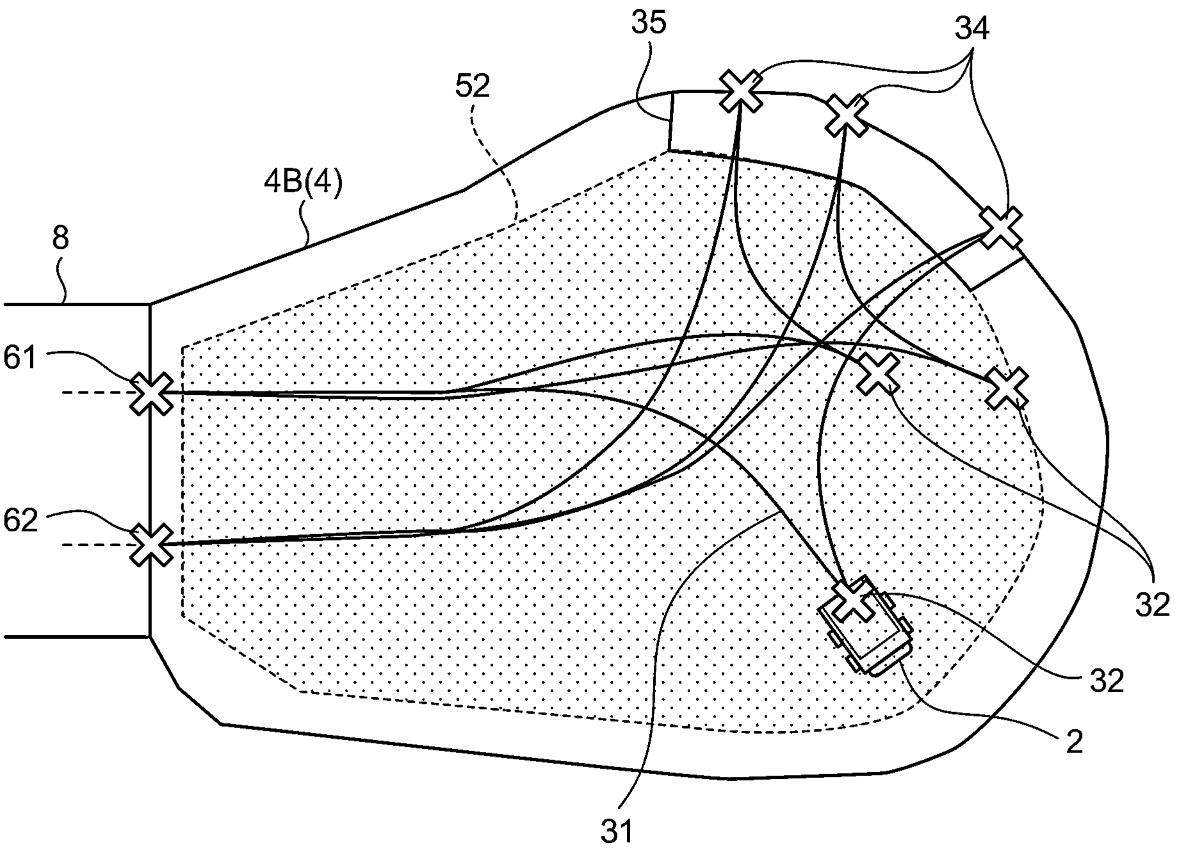
FIG. 26 is a schematic view illustrating the method for generating the wide-area water-sprinkling condition according to the embodiment.

Each of FIGS. 25 and 26 is a schematic view illustrating the method for generating the wide-area water-sprinkling condition according to the embodiment. Each of FIGS. 25 and 26 illustrates the method for generating the wide-area water-sprinkling condition in the soil discharging station 4B. As illustrated in FIG. 25, the second water-sprinkling area 52 may be designated to include the plurality of haul paths 31 generated in the soil discharging station 4B. As illustrated in FIG. 26, the second water-sprinkling area 52 in which the outer shape of the soil discharging station 4B is reduced may be designated. The water-sprinkling condition generation unit 149 generates the water-sprinkling path 41 so that the unmanned water-sprinkling vehicle 3 sprinkles water to the entire second water-sprinkling area 52.

When it is determined in step S2 that the condition input data is acquired (step S2: Yes), the water-sprinkling condition decision unit 148 determines the water-sprinkling condition indicated by the condition input data acquired by the input data acquisition unit 142. The water-sprinkling condition decision unit 148 determines whether the condition input data acquired by the input data acquisition unit 142 is condition input data indicating the non-water-sprinkling condition (step S3).

In step S3, when it is determined that the condition input data acquired by the input data acquisition unit 142 is the condition input data indicating the non-water-sprinkling condition (step S3: Yes), the water-sprinkling condition decision unit 148 decides the non-water-sprinkling condition as the water-sprinkling condition (step S4). After the process of step S4 is performed, the processes of steps S5, S15, S16, and S17 are performed.

When it is determined in step S3 that the condition input data acquired by the input data acquisition unit 142 is not the condition input data indicating the non-water-sprinkling condition (step S3: No), the water-sprinkling condition decision unit 148 determines whether the condition input data acquired by the input data acquisition unit 142 is the condition input data indicating the simple water-sprinkling condition (step S6).

In step S6, when it is determined that the condition input data acquired by the input data acquisition unit 142 is the condition input data indicating the simple water-sprinkling condition (step S6: Yes), the water-sprinkling condition decision unit 148 decides the simple water-sprinkling condition as the water-sprinkling condition (step S7). After the process of step S7 is performed, the processes of steps S8, S15, S16, and S17 described above are performed.

In step S6, when it is determined that the condition input data acquired by the input data acquisition unit 142 is not the condition input data indicating the simple water-sprinkling condition (step S6: No), the water-sprinkling condition decision unit 148 decides the wide-area water-sprinkling condition as the water-sprinkling condition (step S13). After the process of step S13 is performed, the processes of steps S14, S15, S16, and S17 described above are performed.

[Computer System]

Figure 27:
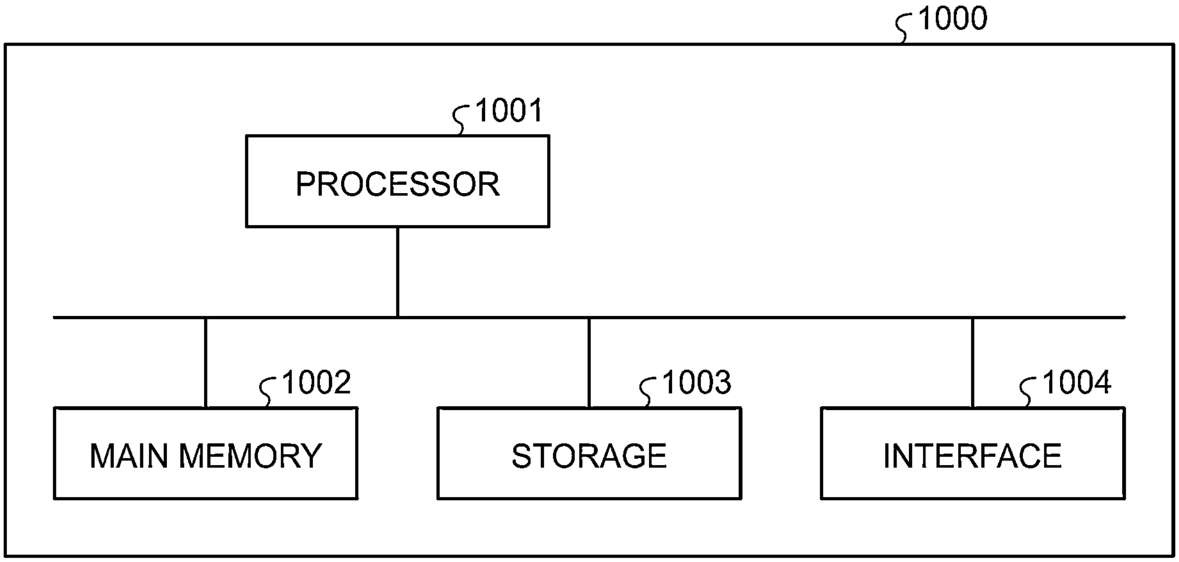
FIG. 27 is a block diagram illustrating a computer system according to the embodiment.

FIG. 27 is a block diagram illustrating a computer system 1000 according to the embodiment. Each of the management device 14, the control device 17, the control device 18, and the control device 19 includes the computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. The functions of the management device 14, the control device 17, the control device 18, and the control device 19 described above are stored in the storage 1003 as computer programs. The processor 1001 reads the computer programs from the storage 1003, develops the computer programs in the main memory 1002, and executes the above-described processes according to the programs. Note that the computer program may be distributed to the computer system 1000 via a network.

According to the above-described embodiment, the computer system 1000 or the computer program can execute: calculating an expected time Te at which the unmanned haul vehicle 2 arrives at the work area 4; deciding the water-sprinkling condition of the unmanned water-sprinkling vehicle 3 in the work area 4 based on the expected time Te; and generating the decided water-sprinkling condition and transmitting the generated water-sprinkling condition to the unmanned water-sprinkling vehicle 3.

[Effects]

As described above, the management system 13 of the workplace 1 according to the embodiment includes the expected time calculation unit 146 that calculates the expected time Te at which the unmanned haul vehicle 2 arrives at the work area 4, and the water-sprinkling condition decision unit 148 that decides the water-sprinkling condition of the unmanned water-sprinkling vehicle 3 in the work area 4 based on the expected time Te.

According to the embodiment, the management system 13 can decide the water-sprinkling condition according to the expected time Te at which the unmanned haul vehicle 2 arrives at the work area 4 so that the haul work of the unmanned haul vehicle 2 is not hindered by the water-sprinkling work of the unmanned water-sprinkling vehicle 3. The water-sprinkling condition generation unit 149 can generate the water-sprinkling condition decided by the water-sprinkling condition decision unit 148. Therefore, a decrease in productivity of the workplace 1 is suppressed.

The management system 13 includes the haul condition generation unit 144 that generates haul traveling data indicating the traveling condition including the target traveling speed Vr and the haul path 31 of the unmanned haul vehicle 2, and the sensor data acquisition unit 141 that acquires position data indicating the current position Pn of the unmanned haul vehicle 2. The expected time calculation unit 146 can calculate the expected time Te based on the haul traveling data of the unmanned haul vehicle 2 and the current position Pn.

The expected time calculation unit 146 calculates the expected time Te before water sprinkling of the unmanned water-sprinkling vehicle 3 is started. As a result, the unmanned haul vehicle 2 is prevented from arriving at the work area 4 during the water-sprinkling work of the unmanned water-sprinkling vehicle 3.

The water-sprinkling condition includes the simple water-sprinkling condition requiring the first time T1 until the end of water sprinkling and the wide-area water-sprinkling condition requiring the second time T2 longer than the first time T1 until the end of water sprinkling. The water-sprinkling condition decision unit 148 decides the water-sprinkling condition so that the water sprinkling ends by the expected time Te at which the unmanned haul vehicle 2 arrives at the work area 4. The haul work of the unmanned haul vehicle 2 is prevented from being hindered by the water-sprinkling work of the unmanned water-sprinkling vehicle 3.

The simple water-sprinkling condition includes the water-sprinkling condition of sprinkling water to the first water-sprinkling area 51 of the work area 4. The wide-area water-sprinkling condition includes the water-sprinkling condition for sprinkling water to the second water-sprinkling area 52 of the work area 4 larger than the first water-sprinkling area 51. By performing the water-sprinkling work based on the simple water-sprinkling condition, an area where mine dust or cloud of dust is likely to be diffused is intensively sprinkled with water in a short time. By performing the water-sprinkling work based on the wide-area water-sprinkling condition, diffusion of mine dust or cloud of dust in a wide area of the work area 4 is suppressed.

The water-sprinkling condition generation unit 149 generates the simple water-sprinkling condition based on the haul path 31 of the unmanned haul vehicle 2. The unmanned haul vehicle 2 travels along the haul path 31. There is a high possibility that mine dust or cloud of dust is diffused in an area where the unmanned haul vehicle 2 travels. The traveling area of the unmanned haul vehicle 2 is intensively sprinkled with water based on the haul path 31 of the unmanned haul vehicle 2, whereby diffusion of mine dust or cloud of dust is suppressed.

The water-sprinkling condition generation unit 149 may generate the simple water-sprinkling condition based on the haul path 31 of the target vehicle indicating the unmanned haul vehicle 2 for which the expected time Te is calculated. By water-sprinkling the scheduled traveling area of the target vehicle immediately before the target vehicle travels in the work area 4, diffusion of mine dust or cloud of dust is effectively suppressed.

The water-sprinkling condition generation unit 149 may generate the simple water-sprinkling condition based on the haul path 31 of the past vehicle indicating the unmanned haul vehicle 2 that traveled in the work area 4 in the past earlier than the unmanned haul vehicle 2 for which the expected time Te is calculated. By water-sprinkling the already-traveled area of the past vehicle, diffusion of mine dust or cloud of dust is effectively suppressed.

The water-sprinkling condition generation unit 149 generates the water-sprinkling path 41 so that at least a part of the haul path 31 and the water-sprinkling path 41 coincide with each other. As a result, the traveling area of the unmanned haul vehicle 2 including one or both of the scheduled traveling area and the already-traveled area is appropriately sprinkled with water.

The water-sprinkling condition generation unit 149 generates the wide-area water-sprinkling condition based on the second water-sprinkling area 52 that is the water-sprinkling target area designated by the target area designation unit 147. As a result, the unmanned water-sprinkling vehicle 3 can sprinkle water not only to the traveling area of the unmanned haul vehicle 2 but also to the wide range of the work area 4 where mine dust or cloud of dust may diffuse. Therefore, the diffusion of mine dust or cloud of dust is effectively suppressed.

The target area designation unit 147 may designate the second water-sprinkling area 52 to include each of the haul path 31 of the target vehicle indicating the unmanned haul vehicle 2 for which the expected time Te is calculated and the haul path 31 of the past vehicle indicating the unmanned haul vehicle 2 that traveled in the work area 4 in the past before the target vehicle. Since each of the scheduled traveling area and the already-traveled area of the unmanned haul vehicle 2 is sprinkled with water, the diffusion of mine dust or cloud of dust is effectively suppressed.

The target area designation unit 147 may designate the second water-sprinkling area 52 to include each of the haul path 31 of the target vehicle indicating the unmanned haul vehicle 2 for which the expected time Te is calculated and the haul path 31 of the future vehicle indicating the unmanned haul vehicle 2 that is to travel in the work area 4 in the future than the target vehicle. Since each of the scheduled traveling areas of the plurality of unmanned haul vehicles 2 are sprinkled with water, the diffusion of mine dust or cloud of dust is effectively suppressed.

The target area designation unit 147 may designate the second water-sprinkling area 52 based on the outer shape of the work area 4. As a result, a wide range of the work area 4 is uniformly sprinkled with water.

The target area designation unit 147 may designate the second water-sprinkling area 52 based on designated input data from the input device 28. As a result, the second water-sprinkling area 52 is designated based on the intention of the manager.

The water-sprinkling condition generation unit 149 generates the water-sprinkling path 41 so that the unmanned water-sprinkling vehicle 3 sprinkles water to the entire second water-sprinkling area 52. Since the entire designated second water-sprinkling area 52 is sprinkled with water, diffusion of mine dust or cloud of dust is effectively suppressed.

When the wide-area water-sprinkling condition is the water-sprinkling condition in which the water sprinkling does not end by the expected time Te, and the simple water-sprinkling condition is the water-sprinkling condition in which the water sprinkling ends by the expected time Te, the simple water-sprinkling condition is decided as the water-sprinkling condition. As a result, before the unmanned haul vehicle 2 arrives at the work area 4, an area where mine dust or cloud of dust is likely to be diffused in the work area 4 is intensively sprinkled with water in a short time. When both the simple water-sprinkling condition and the wide-area water-sprinkling condition are the water-sprinkling conditions in which the water sprinkling ends by the expected time Te, the wide-area water-sprinkling condition is decided as the water-sprinkling condition. As a result, since the wide range of the work area 4 is sprinkled with water, diffusion of mine dust or cloud of dust is effectively suppressed.

As described with reference to FIG. 13, the water-sprinkling condition generation unit 149 can generate the water-sprinkling path 41 (manually generated path) based on the path input data from the input device 28. In addition, the water-sprinkling condition generation unit 149 can automatically generate the water-sprinkling path 41 (automatically generated path) based on the haul path 31 or the second water-sprinkling area 52 (water-sprinkling target area). The manually generated path is prioritized over the automatically generated path. As a result, the water-sprinkling path 41 is generated based on the intention of the manager.

Other Embodiments

In the above-described embodiment, at least a part of the function of the control device 17, the function of the control device 18, and the function of the control device 19 may be provided in the management device 14. At least a part of the function of the management device 14 may be provided in at least one of the control device 17, the control device 18, and the control device 19. For example, in the above-described embodiment, the control device 19 may have at least one of the function of the sensor data acquisition unit 141, the function of the input data acquisition unit 142, the function of the work area data acquisition unit 143, the function of the haul condition generation unit 144, the function of the haul condition transmission unit 145, the function of the expected time calculation unit 146, the function of the target area designation unit 147, the function of the water-sprinkling condition decision unit 148, and the function of the water-sprinkling condition generation unit 149.

In the above-described embodiment, for example, each of the sensor data acquisition unit 141, the input data acquisition unit 142, the work area data acquisition unit 143, the haul condition generation unit 144, the haul condition transmission unit 145, the expected time calculation unit 146, the target area designation unit 147, the water-sprinkling condition decision unit 148, the water-sprinkling condition generation unit 149, the water-sprinkling condition transmission unit 150, and the display control unit 151 may be configured by separate hardware.

REFERENCE SIGNS LIST

1 Workplace
2 Unmanned Haul Vehicle
2A Vehicle Body
2B Traveling Device
2C Dump Body
3 Unmanned Water-Sprinkling Vehicle
3A Vehicle Body
3B Traveling Device
3C Tank
3D Water-Sprinkling Spray
4 Work Area
4A Loading Station
4B Soil Discharging Station
5 Parking Lot
6 Fuel Filling Station
7 Water Supply Station
8 Traveling Path
9 Loading Equipment
9A Swing Body
9B Traveling Body
9C Working Equipment
9D Working Equipment Cylinder
10 Crushing Equipment
11 Fuel Filling Equipment
12 Water Supply Equipment
13 Management System
14 Management Device
15 Communication System
15A Wireless Communication Equipment

15B Wireless Communication Equipment
15C Wireless Communication Equipment
15D Wireless Communication Equipment
16 Control Facility
17 Control Device
18 Control Device
19 Control Device
20 Input Device
21 Display Device
22 Position Sensor
23 Azimuth Sensor
24 Speed Sensor
25 Position Sensor
26 Azimuth Sensor
27 Speed Sensor
28 Input Device
29 Display Device
30 Traveling Point
31 Haul Path
31R Haul Path
31P Haul Path
31F Haul Path
32 Switchback Point
33 Loading Point
34 Soil Discharging Point
35 Soil Discharging Area
40 Traveling Point
41 Water-Sprinkling Path
51 First Water-Sprinkling Area
52 Second Water-Sprinkling Area
61 Entrance Point
62 Exit Point
141 Sensor Data Acquisition Unit
142 Input Data Acquisition Unit
143 Work Area Data Acquisition Unit
144 Haul Condition Generation Unit
145 Haul Condition Transmission Unit
146 Expected Time Calculation Unit
147 Target Area Designation Unit
148 Water-Sprinkling Condition Decision Unit
149 Water-Sprinkling Condition Generation Unit
150 Water-Sprinkling Condition Transmission Unit
151 Display Control Unit
171 Input Data Transmission Unit
172 Display Control Unit
181 Sensor Data Transmission Unit
182 Haul Condition Acquisition Unit
183 Traveling Control Unit
191 Sensor Data Transmission Unit
192 Water-Sprinkling Condition Acquisition Unit
193 Traveling Control Unit
194 Water-Sprinkling Control Unit
1000 Computer System
1001 Processor
1002 Main Memory
1003 Storage
1004 Interface
Ds Distance
Pn Current Position
T1 First Time
T2 Second Time
Te Expected Time
Tn Time Point
Tr Required Time
Vr Target Traveling Speed

The invention claimed is:

1. A management system of a workplace, the system comprising:

an expected time calculation unit that calculates an expected time at which an unmanned haul vehicle arrives at a work area; and a water-sprinkling condition decision unit that decides a water-sprinkling condition of an unmanned water-sprinkling vehicle in the work area based on the expected time.

2. The management system of a workplace according to claim 1, further comprising a water-sprinkling condition generation unit that generates the water-sprinkling condition.

3. The management system of a workplace according to claim 2, further comprising:

a haul condition generation unit that generates haul traveling data indicating a traveling condition including a target traveling speed of the unmanned haul vehicle and a haul path indicating a target traveling route; and a sensor data acquisition unit that acquires position data indicating a current position of the unmanned haul vehicle, wherein the expected time calculation unit calculates the expected time based on the haul traveling data and the position data.

4. The management system of a workplace according to claim 3, wherein the expected time calculation unit calculates the expected time before water sprinkling of the unmanned water-sprinkling vehicle is started.

5. The management system of a workplace according to claim 4, wherein the water-sprinkling condition includes a first water-sprinkling condition requiring a first time until end of water sprinkling and a second water-sprinkling condition requiring a second time longer than the first time until end of water sprinkling, and the water-sprinkling condition decision unit decides the water-sprinkling condition such that water sprinkling is finished by the expected time.

6. The management system of a workplace according to claim 5, wherein the first water-sprinkling condition includes a water-sprinkling condition for sprinkling water to a first water-sprinkling area of the work area, and the second water-sprinkling condition includes a water-sprinkling condition for sprinkling water to a second water-sprinkling area of the work area larger than the first water-sprinkling area.

7. The management system of a workplace according to claim 5, wherein the water-sprinkling condition generation unit generates the first water-sprinkling condition based on the haul path.

8. The management system of a workplace according to claim 7, wherein the water-sprinkling condition generation unit generates the first water-sprinkling condition based on a haul path of a target vehicle indicating the unmanned haul vehicle for which the expected time is calculated.

9. The management system of a workplace according to claim 7, wherein the water-sprinkling condition generation unit generates the first water-sprinkling condition based on a haul path of a past vehicle indicating an unmanned haul vehicle that traveled in the work area in the past before the unmanned haul vehicle for which the expected time is calculated.

10. The management system of a workplace according to claim 7, wherein the water-sprinkling condition includes a water-sprinkling path indicating a target traveling route of the unmanned water-sprinkling vehicle, and the water-sprinkling condition generation unit generates the water-sprinkling path such that at least a part of the haul path and the water-sprinkling path coincide with each other.

11. The management system of a workplace according to claim 6, further comprising a target area designation unit that designates the second water-sprinkling area in the work area, wherein the water-sprinkling condition generation unit generates a second water-sprinkling condition based on the second water-sprinkling area designated by the target area designation unit.

12. The management system of a workplace according to claim 11, wherein the target area designation unit designates the second water-sprinkling area to include each of a haul path of a target vehicle indicating the unmanned haul vehicle for which the expected time is calculated and a haul path of a past vehicle indicating an unmanned haul vehicle that traveled in the work area in the past before the target vehicle.

13. The management system of a workplace according to claim 11, wherein the target area designation unit designates the second water-sprinkling area to include each of a haul path of a target vehicle indicating the unmanned haul vehicle for which the expected time is calculated and a haul path of a future vehicle indicating an unmanned haul vehicle that is to travel the work area in the future than the target vehicle.

14. The management system of a workplace according to claim 11, wherein the target area designation unit designates the second water-sprinkling area based on an outer shape of the work area.

15. The management system of a workplace according to claim 11, wherein the target area designation unit designates the second water-sprinkling area based on designated input data from an input device.

16. The management system of a workplace according to claim 11, wherein the water-sprinkling condition includes a water-sprinkling path indicating a target traveling route of the unmanned water-sprinkling vehicle, and the water-sprinkling condition generation unit generates the water-sprinkling path such that the entire second water-sprinkling area is sprinkled with water by the unmanned water-sprinkling vehicle.

17. The management system of a workplace according to claim 5, wherein, when the second water-sprinkling condition is a water-sprinkling condition in which water sprinkling does not end by the expected time and the first water-sprinkling condition is a water-sprinkling condition in which water sprinkling ends by the expected time, the water-sprinkling condition decision unit decides the first water-sprinkling condition as the water-sprinkling condition, and when both the first water-sprinkling condition and the second water-sprinkling condition are water-sprinkling conditions in which water sprinkling ends by the expected time, the water-sprinkling condition decision unit decides the second water-sprinkling condition as the water-sprinkling condition.

18. The management system of a workplace according to claim 2, wherein the water-sprinkling condition includes a water-sprinkling path indicating a target traveling route of the unmanned water-sprinkling vehicle, the water-sprinkling path that is able to be generated by the water-sprinkling condition generation unit includes a manually generated path generated based on path input data from an input device, and an automatically generated path generated based on a haul path indicating a target traveling route of the unmanned haul vehicle or a water-sprinkling target area designated in the work area, and the water-sprinkling condition generation unit does not generate the automatically generated path when the manually generated path is generated.

19. The management system of a workplace according to claim 1, wherein the work area includes at least one of a loading station where loading equipment loads a load onto the unmanned haul vehicle and a soil discharging station where the unmanned haul vehicle discharges the load.

20. A method for managing a workplace, the method comprising:

calculating an expected time at which an unmanned haul vehicle arrives at a work area;

deciding a water-sprinkling condition of an unmanned water-sprinkling vehicle in the work area based on the expected time; and generating the decided water-sprinkling condition and transmitting the generated water-sprinkling condition to the unmanned water-sprinkling vehicle.

* * * * *